US010730038B2

(12) United States Patent
Holtcamp et al.

(10) Patent No.: US 10,730,038 B2
(45) Date of Patent: Aug. 4, 2020

(54) METALLOCENE CATALYSTS, CATALYST SYSTEMS, AND METHODS FOR USING THE SAME

(71) Applicant: ExxonMobil Chemical Patents Inc., Baytown, TX (US)

(72) Inventors: Matthew W. Holtcamp, Huffman, TX (US); Matthew S. Bedoya, Humble, TX (US); Subramaniam Kuppuswamy, Mont Belvieu, TX (US)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 0 days.

(21) Appl. No.: 16/339,735

(22) PCT Filed: Sep. 6, 2017

(86) PCT No.: PCT/US2017/050282
§ 371 (c)(1),
(2) Date: Apr. 5, 2019

(87) PCT Pub. No.: WO2018/067259
PCT Pub. Date: Apr. 12, 2018

(65) Prior Publication Data
US 2019/0283009 A1 Sep. 19, 2019

Related U.S. Application Data

(60) Provisional application No. 62/404,506, filed on Oct. 5, 2016.

(51) Int. Cl.
*C07F 17/00* (2006.01)
*C08F 4/6592* (2006.01)
(Continued)

(52) U.S. Cl.
CPC ....... *B01J 31/2295* (2013.01); *B01J 31/1633* (2013.01); *C07F 17/00* (2013.01);
(Continued)

(58) Field of Classification Search
CPC .. C07F 17/00; C08F 4/65927; C08F 4/65904; C08F 210/16; C08L 23/0815
See application file for complete search history.

(56) References Cited

U.S. PATENT DOCUMENTS

2011/0004036 A1 1/2011 Englmann et al.

FOREIGN PATENT DOCUMENTS

EP 0628566 A 12/1994
WO 2013/064235 A 5/2013

OTHER PUBLICATIONS

Tian, Jun et al., "Synthesis of and Olefin Polymerization Using Tethered, ansa-Metallocene Complexes", Macromolecules, vol. 34, No. 10., pp. 3120-3122, May 8, 2001, DOI: 10.1021/ma002135v.
(Continued)

*Primary Examiner* — Caixia Lu
(74) *Attorney, Agent, or Firm* — ExxonMobil Chemical Patents, Inc.—Law Department

(57) ABSTRACT

Disclosed herein is a catalyst compound represented by Formula (I) or Formula (II):
(Continued)

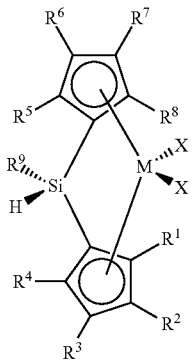

(I)

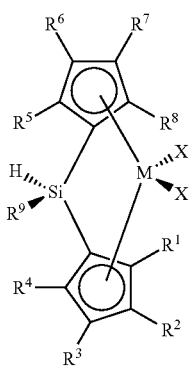

(II)

M is a group 4 metal. Each of $R^1$, $R^2$, $R^3$, $R^4$, $R^5$, $R^6$, $R^7$, $R^8$, and $R^9$ is independently hydrogen, or a C1-C50 substituted or unsubstituted hydrocarbyl, halocarbyl, silylcarbyl, alkoxyl, siloxyl, or one or more of $R^1$ and $R^2$, $R^2$ and $R^3$, $R^3$ and $R^4$, $R^5$ and $R^6$, $R^6$ and $R^7$, and $R^7$ and $R^8$ are joined to form cyclic a saturated or unsaturated ring. Each X is independently a halide or C1-C50 substituted or unsubstituted hydrocarbyl, hydride, amide, alkoxide, sulfide, phosphide, halide, or a combination thereof, or two Xs are joined together to form a metallocycle ring, or two Xs are joined to form a chelating ligand, a diene ligand, or an alkylidene.

Also disclosed is a method for using the catalyst compound in a catalyst system to produce polyolefin polymers.

22 Claims, 2 Drawing Sheets

(51) Int. Cl.
  *C08F 4/653* (2006.01)
  *C08F 210/16* (2006.01)
  *C08L 23/08* (2006.01)
  *B01J 31/22* (2006.01)
  *B01J 31/16* (2006.01)
  *C08F 4/659* (2006.01)

(52) U.S. Cl.
  CPC ...... *C08F 4/65908* (2013.01); *C08F 4/65912* (2013.01); *C08F 4/65916* (2013.01); *C08F 4/65925* (2013.01); *C08F 4/65927* (2013.01); *C08F 210/16* (2013.01); *C08L 23/0815* (2013.01); *B01J 2531/48* (2013.01); *B01J 2531/49* (2013.01); *C08F 2500/05* (2013.01)

(56) References Cited

OTHER PUBLICATIONS

Antinolo, Antonio et al., "Hydrosilylation in the Design and Functionalization of ansa-Metallocene Complexes", Organometallics, American Chemical Society, vol. 23, No. 17, pp. 4062-4069, Aug. 16, 2004, DOI: 10.1021/0M049791U.

Cruz, V.L., "3D-QSAR study of ansa-metallocene catalytic behavior in ethylene polymerization", Polymer, Elsevier Science Direct, vol. 48, No. 16, pp. 4463-4674, Jul. 20, 2007, DOI: 10.1016/J.POLYMER.2007.05.081.

Zhang, Yuetao et al., "Silyium-metallocenium dications derived from hydrosilyl-bridged metallocenes and roles in polymerization of polar and nonpolar vinyl monomers", Journal of Organometallic Chemistry, vol. 695, No. 10-11, pp. 1464-1471, Mar. 3, 2010, DOI:10.1016/j.jorganchem.2010.02.030.

Sandhya, K. S. et al., "Revisiting the Stereochemistry of Propylene Isotactic Polymerization Reaction Mechanism on C2 Symmetric [SiH2(Ind)2ZrCH3]+ and [SiH2(Ind)2ZrCH3]+[CH3B(C6F5)3]-", Bulletin of the Chemical Society of Japan, vol. 89, No. 9, pp. 1093-1105, DOI:10.1246/bcsj.20160119.

Yang, S.H. et al., "A Density Functional Study on the Insertion Mechanism for Metallocene-Catalyzed Styrene Polymerization", Polymeric Materials: Science and Engineering, American Chemical Society. vol. 84, pp. 491-492, Jan. 1, 2001. ISSN: 0743-0515.

METALLOCENE CATALYSTS, CATALYST SYSTEMS, AND METHODS FOR USING THE SAME

CROSS REFERENCE TO RELATED APPLICATIONS

This application is a National Phase Application claiming priority to PCT Application Serial No. PCT/US2017/050282 filed Sep. 6, 2017, which claims priority to and the benefit of U.S. Provisional Ser. No. 62/404,506 filed Oct. 5, 2016, the disclosure of which are hereby incorporated by reference in their entirety.

FIELD OF THE INVENTION

The present disclosure relates to novel catalyst compounds comprising H—Si bridges, catalyst systems comprising such catalyst compounds and uses thereof.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers.

Low density polyethylene is generally prepared at high pressure using free radical initiators or in gas phase processes using Ziegler-Natta or vanadium catalysts. Low density polyethylene typically has a density at about 0.916 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene with a similar density that does not contain branching is known as "linear low density polyethylene" ("LLDPE") and is typically produced with conventional Ziegler-Natta catalysts or with metallocene catalysts. "Linear" means that the polyethylene has few, if any, long chain branches, typically referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$ and are generally prepared with Ziegler-Natta or chrome catalysts. Very low density polyethylenes ("VLDPEs") can be produced by a number of different processes yielding polyethylenes typically having a density 0.890 to 0.915 g/cm$^3$.

Copolymers of polyolefins, such as polyethylene, have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst. The comonomer content of a polyolefin (e.g., wt % of comonomer incorporated into a polyolefin backbone) influences the properties of the polyolefin (and composition of the copolymers) and is dependent on the identity of the polymerization catalyst. As used herein, "low comonomer content" is defined as a polyolefin having less than about 8 wt % of comonomer based upon the total weight of the polyolefin.

The high molecular weight fraction produced by the second catalyst compound may have a high comonomer content. As used herein, "high comonomer content" is defined as a polyolefin having greater than about 8 wt % of comonomer based upon the total weight of the polyolefin.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Also like comonomer content, a composition distribution of a copolymer composition is dependent on the identity of the catalyst used to form the polyolefins of the composition. Ziegler-Natta catalysts and chromium based catalysts produce compositions with broad composition distributions (BCD), whereas metallocene catalysts typically produce compositions with narrow composition distributions (NCD).

Furthermore, polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight ("HMW") fraction of the composition with the improved processing properties of a low molecular weight ("LMW") fraction of the composition. As used herein, "high molecular weight" is defined as a number average molecular weight (Mn) value of 100,000 or more. "Low molecular weight" is defined as an Mn value of less than 100,000.

For example, useful bimodal polyolefin compositions include a first polyolefin having low molecular weight and low comonomer content while a second polyolefin has a high molecular weight and high comonomer content. Compositions having this broad orthogonal composition distribution (BOCD) in which the comonomer is incorporated predominantly in the high molecular weight chains can provide improved physical properties, for example toughness properties and environmental stress crack resistance (ESCR).

There are several methods for producing bimodal or broad molecular weight distribution polyolefins, e.g., melt blending, reactors in series or parallel configuration, or single reactor with bimetallic catalysts. However, these methods, such as melt blending, suffer from the disadvantages brought by the need for complete homogenization of polyolefin compositions and high cost.

There is a need in the art for linear polyolefin copolymers having a high comonomer content and high molecular weight. There is also a need for BOCD polyolefin copolymer compositions having increased density split and high comonomer content.

SUMMARY OF THE INVENTION

In at least one embodiment, a catalyst compound is represented by Formula (I) or Formula (II):

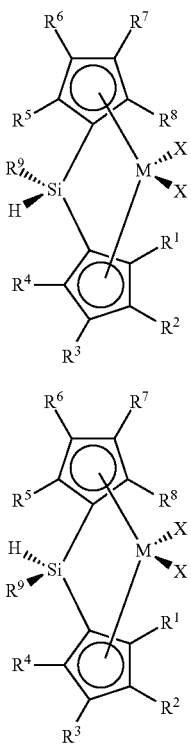

where M is a group 4 metal,
each of $R^1$, $R^2$, $R^3$, $R^4$, $R^5$, $R^6$, $R^7$, $R^8$, and $R^9$ is independently hydrogen, or a C1-C50 substituted or unsubstituted hydrocarbyl, halocarbyl, silylcarbyl, alkoxyl, siloxyl, or one or more of $R^1$ and $R^2$, $R^2$ and $R^3$, $R^3$ and $R^4$, $R^5$ and $R^6$, $R^6$ and $R^7$, and $R^7$ and $R^8$ are joined to form cyclic a saturated or unsaturated ring,
each X is independently a halide or C1-C50 substituted or unsubstituted hydrocarbyl, hydride, amide, alkoxide, sulfide, phosphide, halide, or a combination thereof, or two Xs are joined together to form a metallocycle ring, or two Xs are joined to form a chelating ligand, a diene ligand, or an alkylidene.

In another embodiment, a process for producing a polyolefin composition comprises contacting one or more olefins with a catalyst system comprising: (a) the catalyst compound represented by Formula (I) or Formula (II); and (b) a bridged or unbridged metallocene catalyst compound other than the catalyst compound represented by Formula (I) or Formula (II).

DETAILED DESCRIPTION

Figure 1:
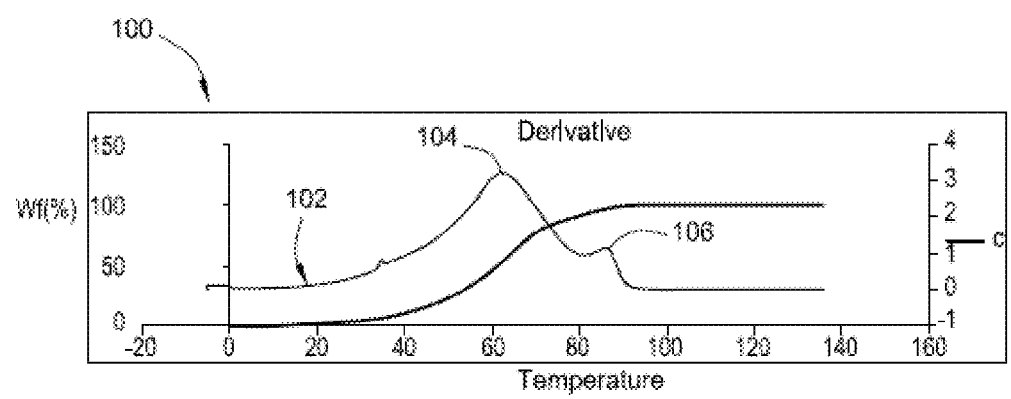
FIG. 1 is a TREF graph of polyethylene copolymer produced by supported Catalyst 1.

For the purposes of the present disclosure, the numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: $P/(T \times W)$ and expressed in units of $gPgcat^{-1}hr^{-1}$. Conversion is the amount of monomer that is converted to polymer product, and is reported as mol % and is calculated based on the polymer yield (weight) and the amount of monomer fed into the reactor. Catalyst activity is a measure of how active the catalyst is and is reported as the mass of product polymer (P) produced per mass of supported catalyst (cat) (gP/g supported cat). In an at least one embodiment, the activity of the catalyst is at least 800 gpolymer/gsupported catalyst/hour, such as about 1,000 or more gpolymer/gsupported catalyst/hour, such as about 2,000 or more gpolymer/gsupported catalyst/hour, such as about 3,000 or more gpolymer/gsupported catalyst/hour, such as about 4,000 or more gpolymer/gsupported catalyst/hour, such as about 5,000 or more gpolymer/gsupported catalyst/hour.

An "olefin," alternatively referred to as "alkene," is a linear, branched, or cyclic compound of carbon and hydrogen having at least one double bond. For the purposes of the present disclosure, ethylene shall be considered an α-olefin. When a polymer or copolymer is referred to as comprising an olefin, the olefin present in such polymer or copolymer is the polymerized form of the olefin. For example, when a copolymer is said to have an ethylene content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of "copolymer," as used herein, includes terpolymers and the like. An oligomer is typically a polymer having a low molecular weight, such as an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

A "catalyst system" is a combination of at least one catalyst compound represented by Formula (I) and/or Formula (II) and a second system component, such as a second catalyst compound and/or activator. The catalyst system may have at least one activator, at least one support material, and/or at least one co-activator. When catalyst systems are described as comprising neutral stable forms of the components, it is well understood by one of ordinary skill in the art, that the ionic form of the component is the form that reacts with the monomers to produce polymers. For the purposes of the present disclosure, "catalyst system" includes both neutral and ionic forms of the components of a catalyst system.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol. Molecular weight distribution ("MWD") is equivalent to the expression $M_w/M_n$. The expression $M_w/M_n$ is the ratio of the weight average molecular weight ($M_w$) to the number average molecular weight ($M_n$).

The distribution and the moments of molecular weight (Mw, Mn, Mw/Mn, etc.), the comonomer content (C2, C3, C6, etc.) and the long chain branching (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 mL/min and the nominal injection volume is 200 µL. The whole system including transfer lines, columns, detectors are contained in an oven maintained at 145° C. A given amount of polymer sample is weighed and sealed in a standard vial with 80 µL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration (c), at each point in the chromatogram is calculated from the baseline-subtracted IR5 broadband signal intensity (I), using the following equation:

$$c = \beta I$$

where β is the mass constant determined with PE or PP standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M. The MW at each elution volume is calculated with following equation.

$$\log M = \frac{\log(K_{PS}/K)}{a+1} + \frac{a_{PS}+1}{a+1} \log M_{PS}$$

where the variables with subscript "PS" stands for polystyrene while those without a subscript are for the test samples. In this method, $a_{PS}=0.67$ and $K_{PS}=0.000175$ while a and K are calculated from a series of empirical formula published in the literature (T. Sun, P. Brant, R. R. Chance, and W. W. Graessley, Macromolecules, Volume 34, Number 19, pp. 6812-6820, (2001)). Specifically, a/K=0.695/0.000579 for PE and 0.705/0.0002288 for PP.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR such as EMCC commercial grades about LLDPE.

The LS detector is the 18-angle Wyatt Technology High Temperature DAWN HELEOSII. The LS molecular weight (AM) at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the IR5 analysis, $A_2$ is the second virial coefficient. $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and X=665 nm.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$[\eta] = \eta_s / c$$

where c is concentration and was determined from the IR5 broadband channel output. The viscosity MW at each point is calculated from the below equation:

$$M = K_{PS} M^{\alpha_{PS}+1}/[\eta].$$

In the present disclosure, a catalyst may be described as a catalyst precursor, a pre-catalyst compound, catalyst compound or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion.

For purposes of the present disclosure in relation to catalyst compounds, the term "substituted" means that a hydrogen group has been replaced with a hydrocarbyl group, a heteroatom, or a heteroatom containing group. For example, methyl cyclopentadienyl (MeCp) is a Cp group substituted with a methyl group, ethyl alcohol is an ethyl group substituted with an —OH group For purposes of the present disclosure, "alkoxides" include those where the alkyl group is a C1 to C10 hydrocarbyl. The alkyl group may be straight chain, branched, or cyclic. The alkyl group may be saturated or unsaturated. In at least one embodiment, the alkyl group may comprise at least one aromatic group. The term "alkoxy" or "alkoxide" preferably means an alkyl ether or aryl ether radical wherein the term alkyl is a C1 to C10 alkyl. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like.

The present disclosure describes transition metal complexes. The term complex is used to describe molecules in which an ancillary ligand is coordinated to a central transition metal atom. The ligand is stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal.

The following abbreviations may be used in this disclosure: dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, sMAO is supported methylalumoxane, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

The terms "hydrocarbyl radical," "hydrocarbyl," "hydrocarbyl group," "alkyl radical," and "alkyl" are used interchangeably throughout this disclosure. Likewise, the terms "group", "radical", and "substituent" are also used interchangeably in this disclosure. For purposes of this disclosure, "hydrocarbyl radical" is defined to be C1-C100 radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "aryl" or "aryl group" means a carbon-containing aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

"Complex" as used herein, is also often referred to as catalyst precursor, precatalyst, catalyst, catalyst compound, transition metal compound, or transition metal complex. These terms are used interchangeably. Activator and cocatalyst are also used interchangeably.

A scavenger is a compound that may be added to a catalyst system to facilitate polymerization by scavenging impurities. Some scavengers may also act as activators and may be referred to as co-activators. A co-activator, that is not a scavenger, may also be used in conjunction with an activator in order to form an active catalyst system. In at least one embodiment, a co-activator can be pre-mixed with the transition metal compound to form an alkylated transition metal compound.

In the description herein, the catalyst may be described as a catalyst precursor, a pre-catalyst compound, catalyst compound or a transition metal compound, and these terms are used interchangeably. A polymerization catalyst system is a catalyst system that can polymerize monomers into polymer.

The term "continuous" means a system that operates without interruption or cessation for a period of time. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, *Ind. Eng. Chem. Res.* (2000), 29, 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Catalyst Compounds

The present disclosure provides novel catalyst compounds comprising H—Si bridges and catalyst systems comprising such catalyst compounds and uses thereof.

In at least one embodiment, the present disclosure provides a catalyst compound, and catalyst systems comprising such compounds, represented by Formula (I) or Formula (II):

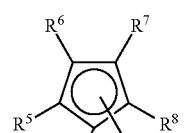

(I)

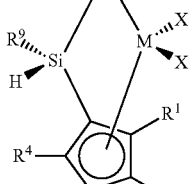

(II)

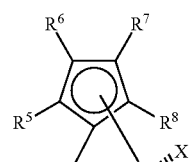

M is a group 4 metal. Each of $R^1$, $R^2$, $R^3$, $R^4$, $R^5$, $R^6$, $R^7$, $R^8$, and $R^9$ is independently hydrogen, or a C1-C50 substituted or unsubstituted hydrocarbyl, halocarbyl, silylcarbyl, alkoxyl, siloxyl, or one or more of $R^1$ and $R^2$, $R^2$ and $R^3$, $R^3$ and $R^4$, $R^5$ and $R^6$, $R^6$ and $R^7$, and $R^7$ and $R^8$ are joined to form a saturated or unsaturated ring. Each X is independently a halide or C1-C50 substituted or unsubstituted hydrocarbyl, hydride, amide, alkoxide, sulfide, phosphide, halide, or a combination thereof, or two Xs are joined together to form a metallocycle ring, or two Xs are joined to form a chelating ligand, a diene ligand, or an alkylidene.

In at least one embodiment, $R^9$ is C1-C20 substituted or unsubstituted hydrocarbyl. $R^9$ may be unsubstituted phenyl or linear or branched C1-C5 alkyl.

Each of $R^6$ or $R^7$ and $R^2$ or $R^3$ may be C1-C20 substituted or unsubstituted hydrocarbyl. Each of $R^6$ or $R^7$ and $R^2$ or $R^3$ may be linear or branched C3-C10 unsubstituted hydrocarbyl.

Each X may be independently a halide or C1-C10 substituted or unsubstituted hydrocarbyl.

In at least one embodiment, M is Ti, Hf, or Zr.

The catalyst compound represented by Formula (I) or Formula (II) may be:

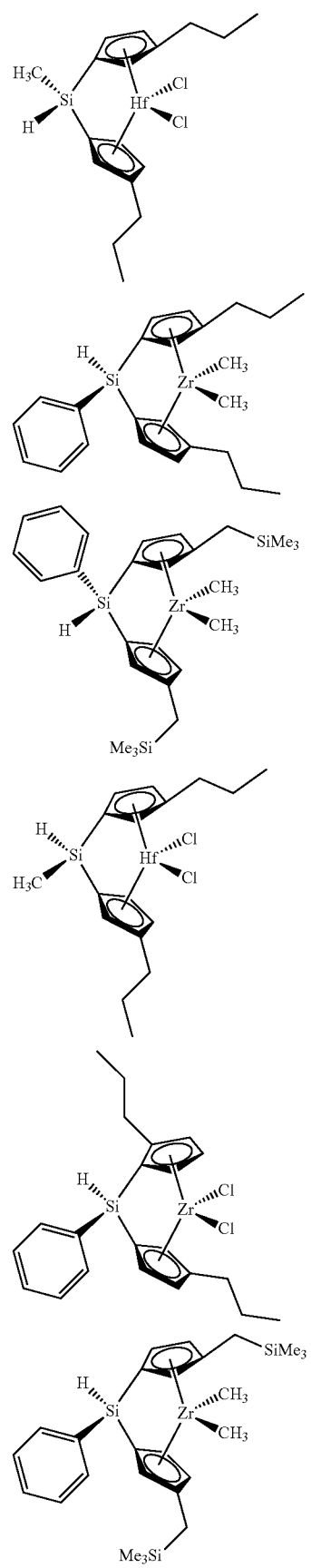

-continued
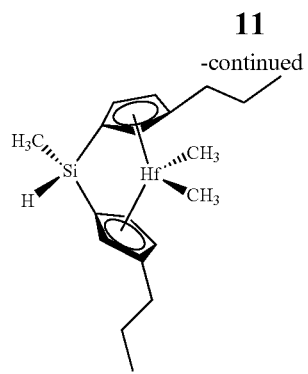
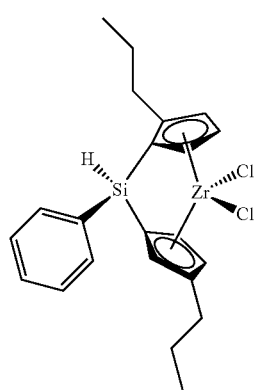
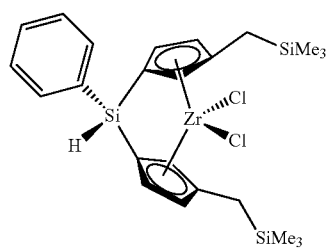
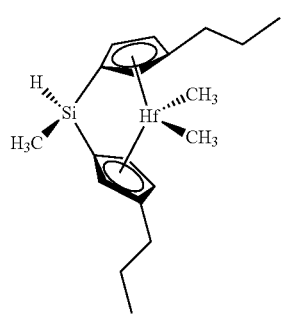
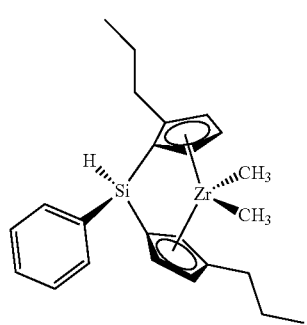
-continued
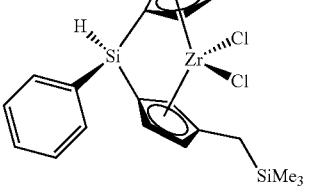
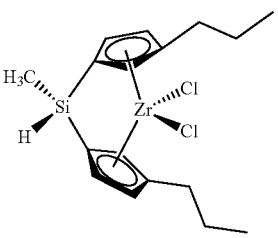
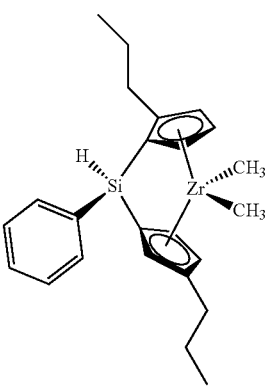
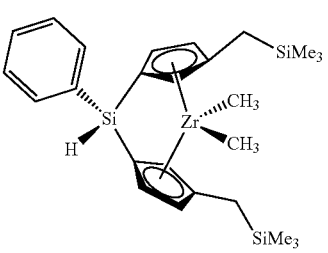
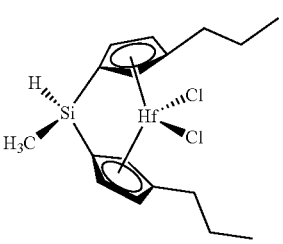
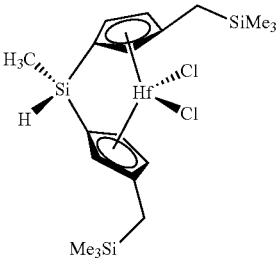

-continued
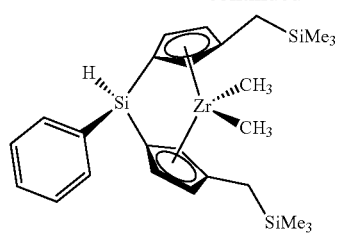
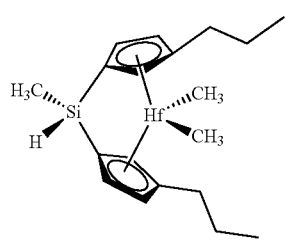
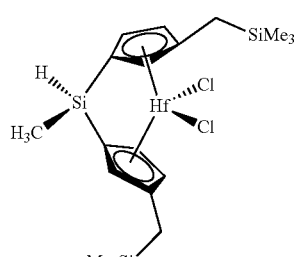
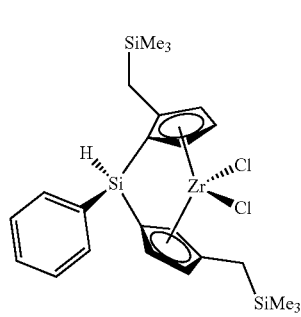
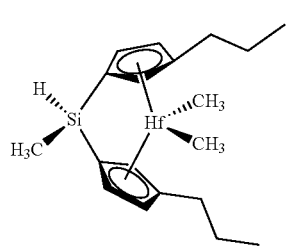
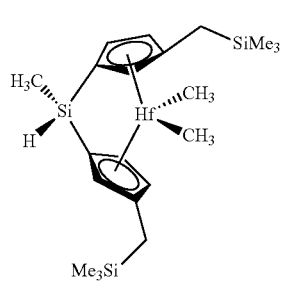
-continued
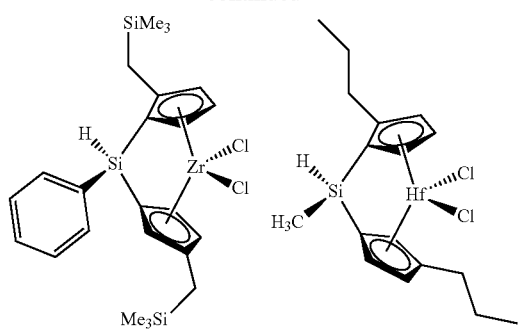
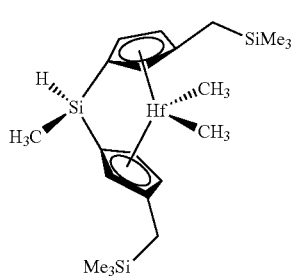
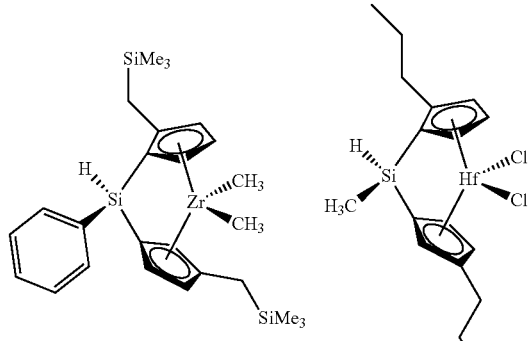
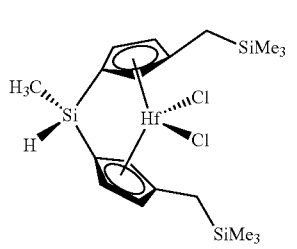
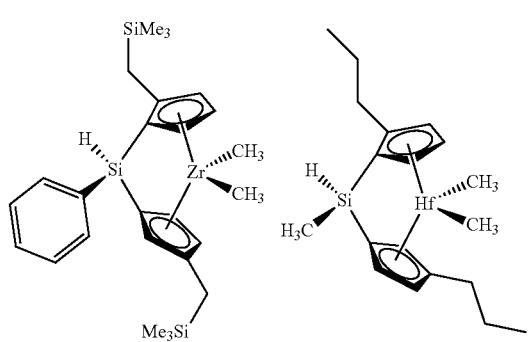

-continued
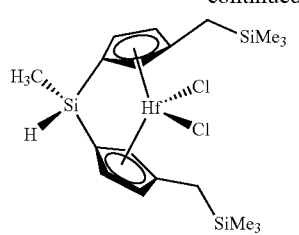
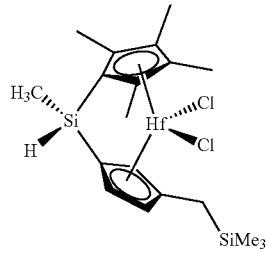
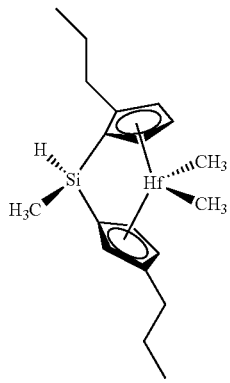
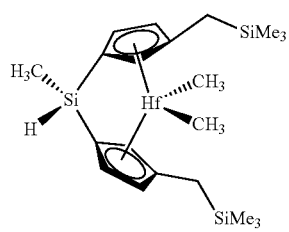
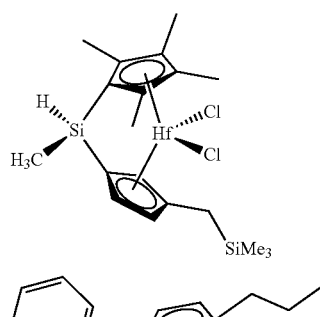
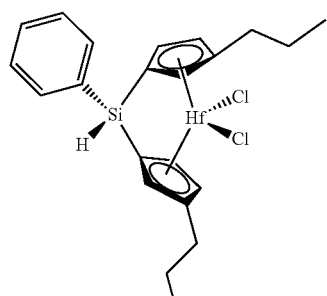
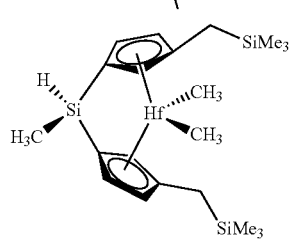
-continued
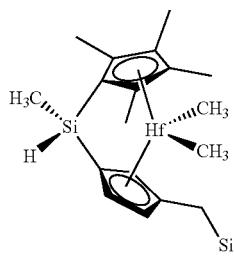
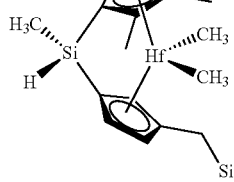
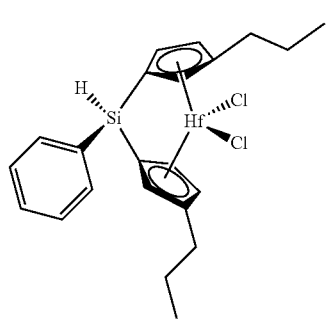
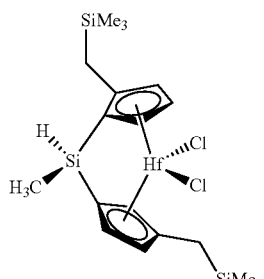
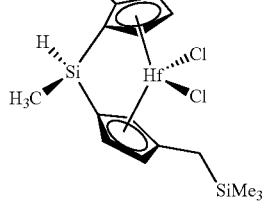
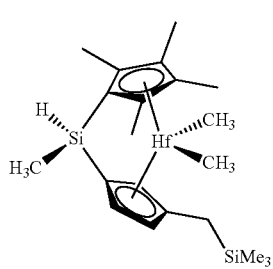
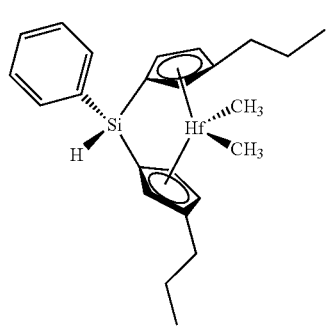

-continued
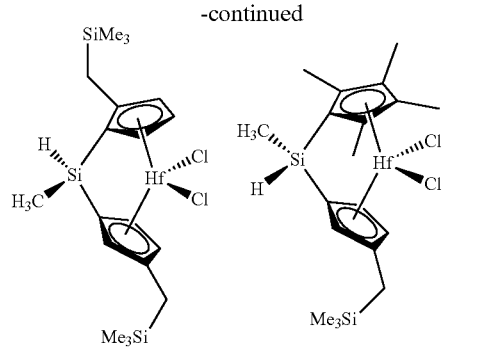
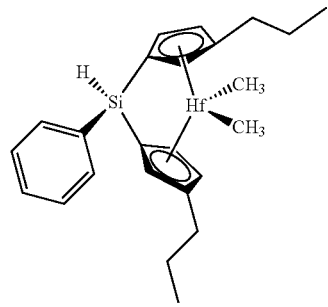
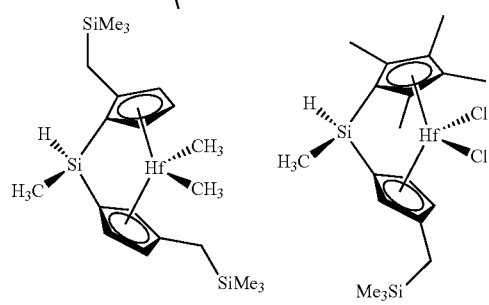
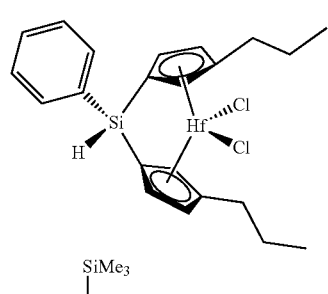
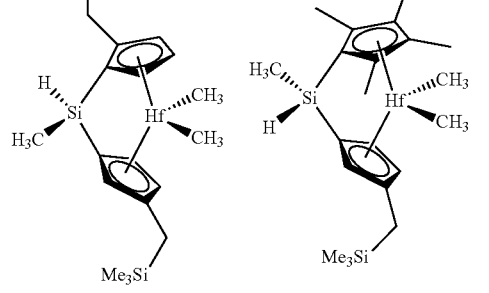
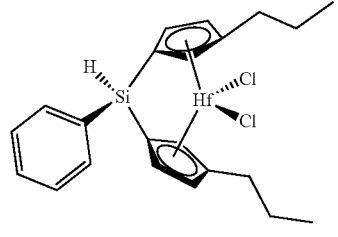
-continued
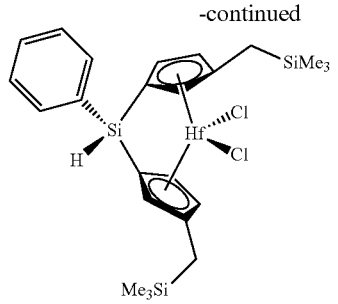
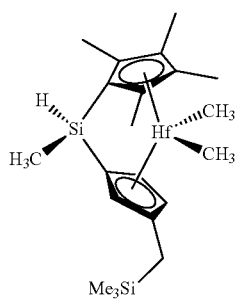
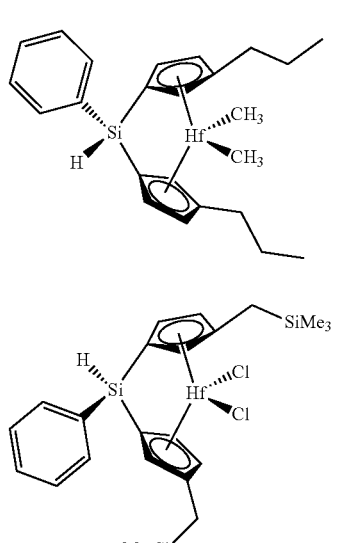
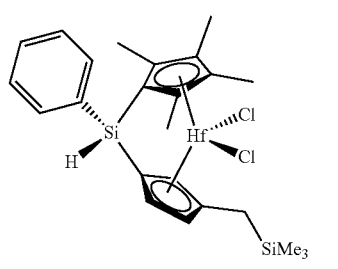
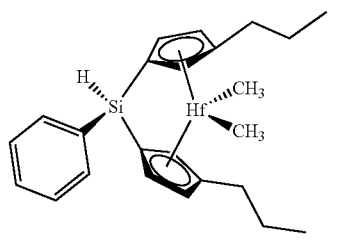

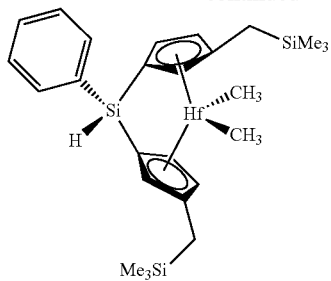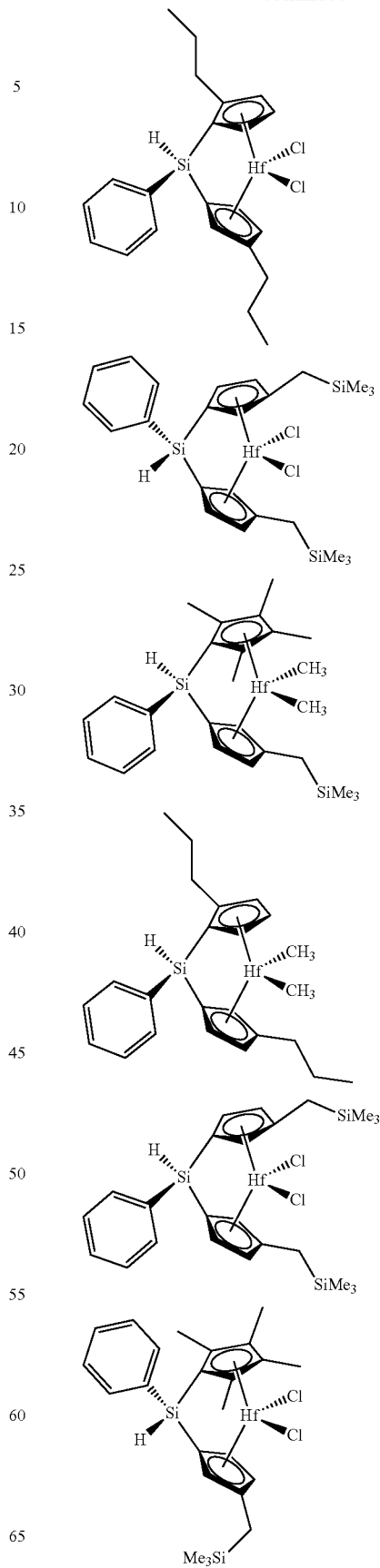

-continued
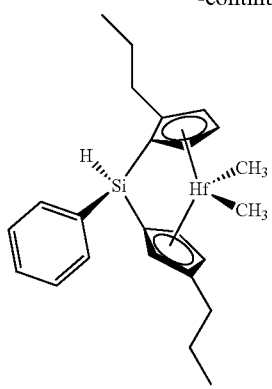
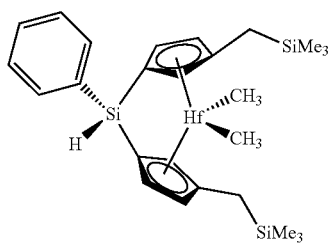
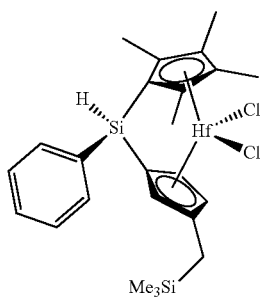
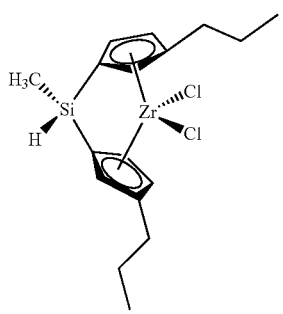
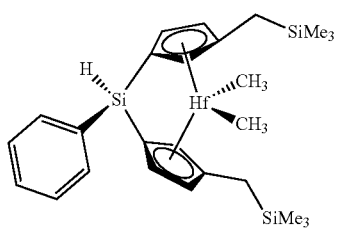
-continued
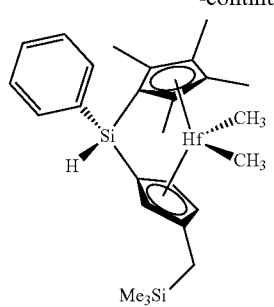
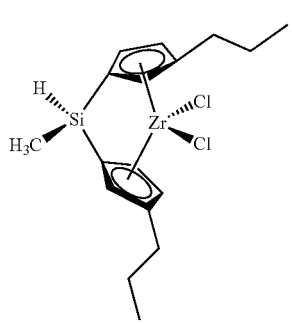
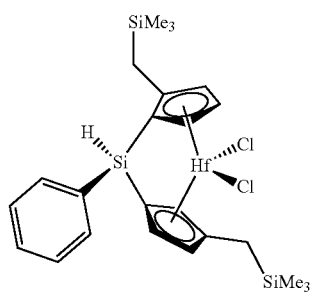
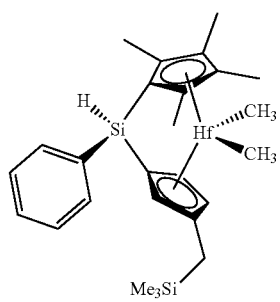
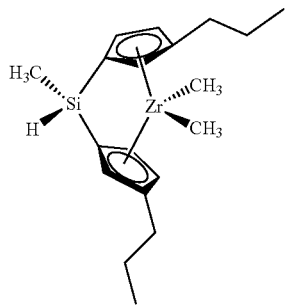

-continued
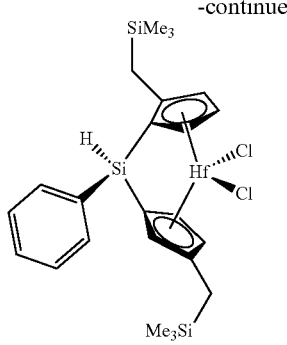
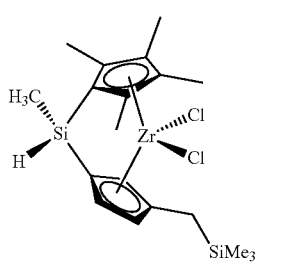
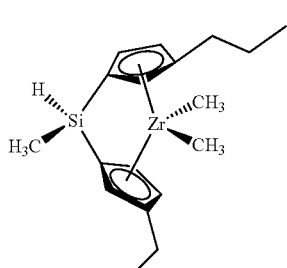
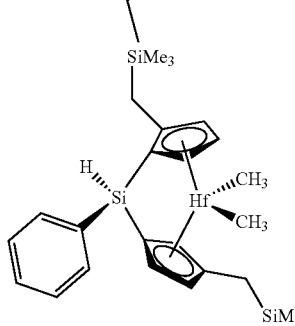
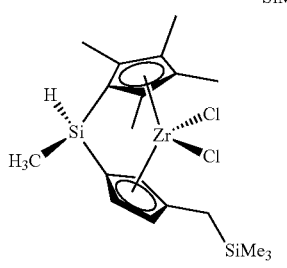
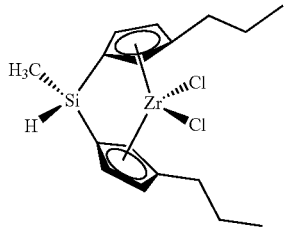
-continued
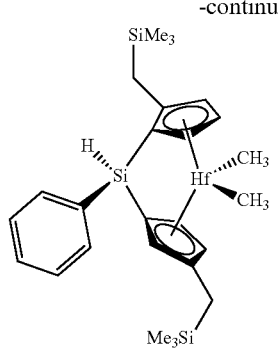
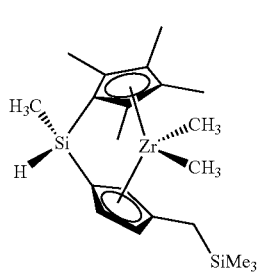
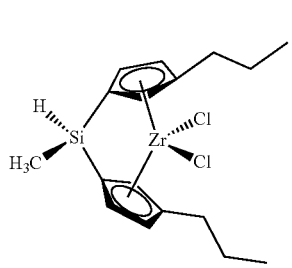
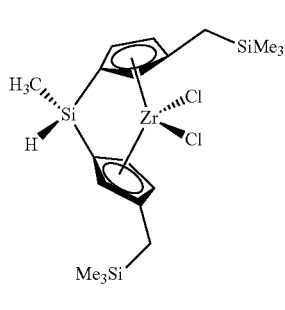
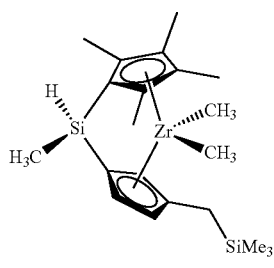
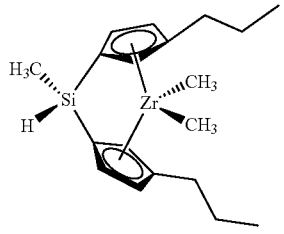

-continued
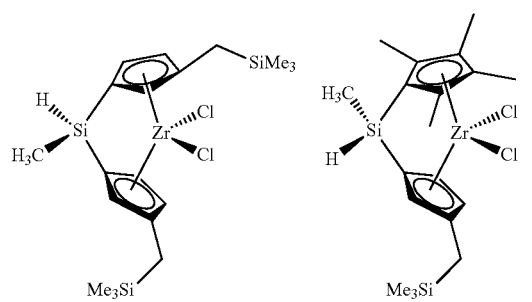
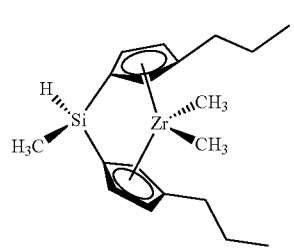
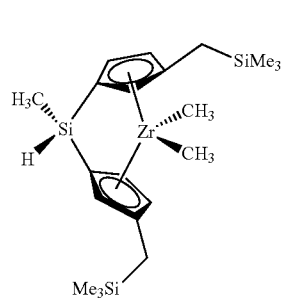
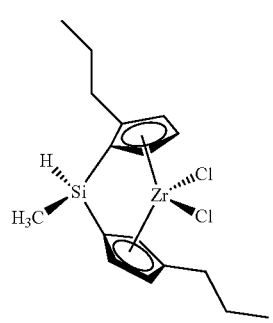
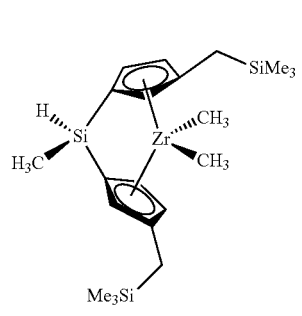
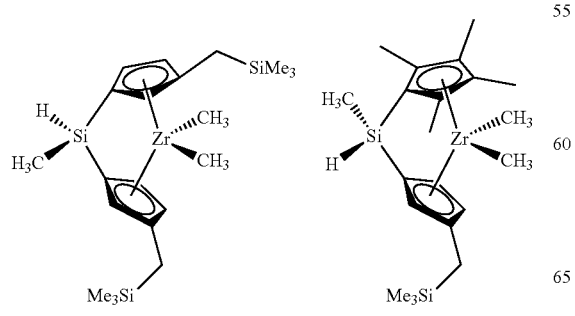
-continued
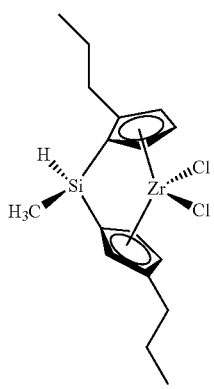
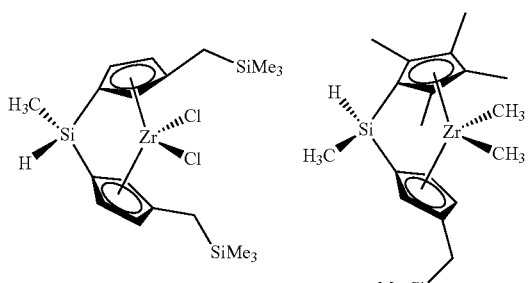
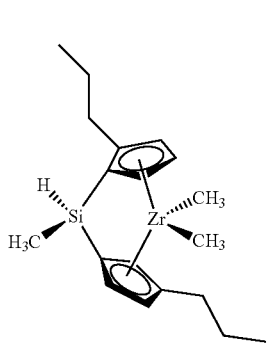
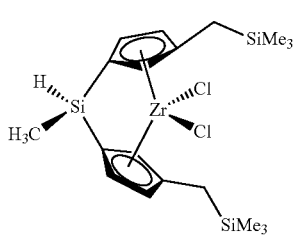
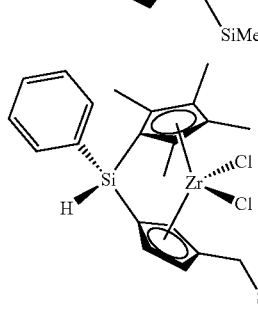

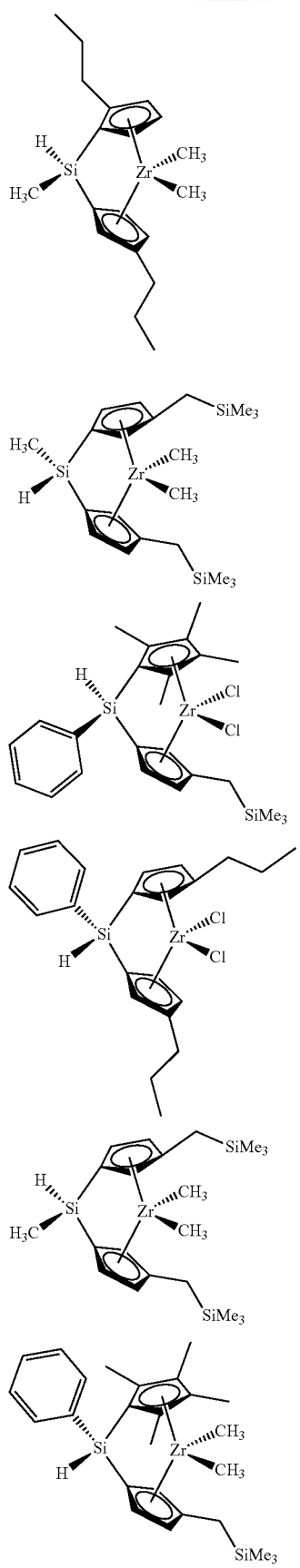
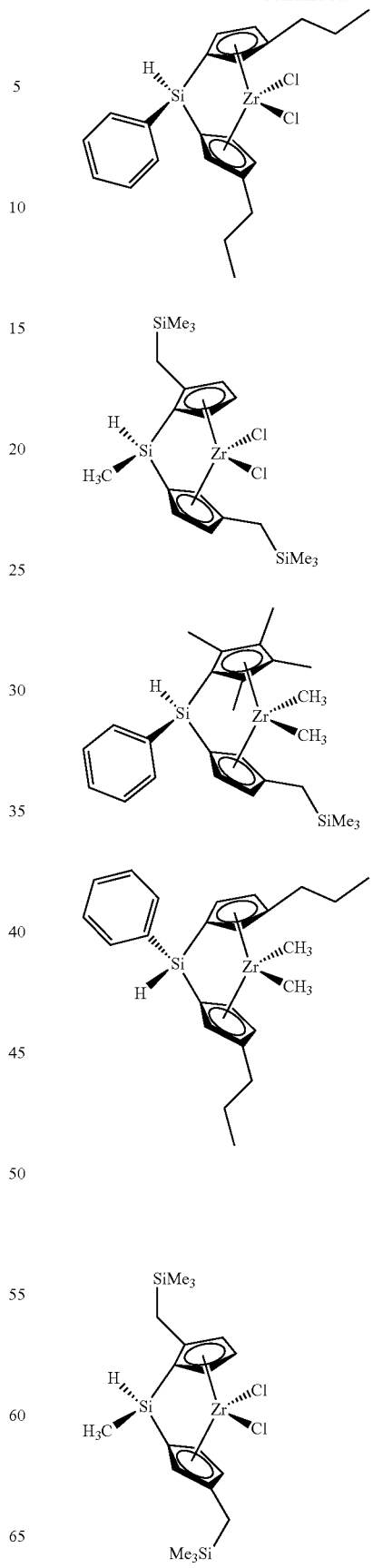

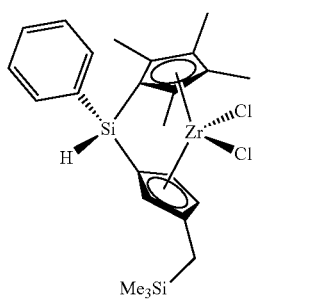
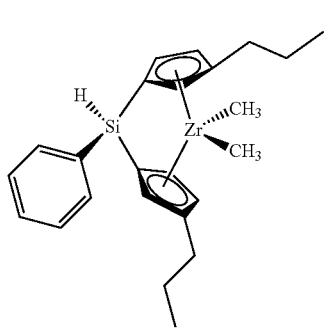
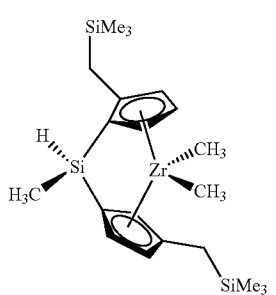
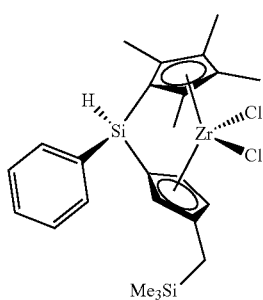
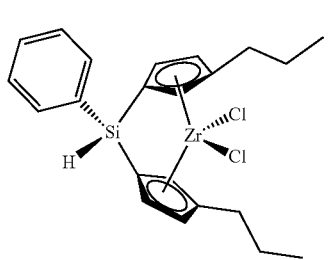
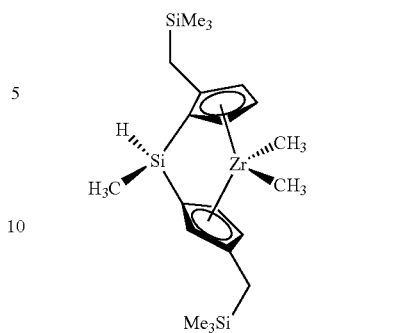
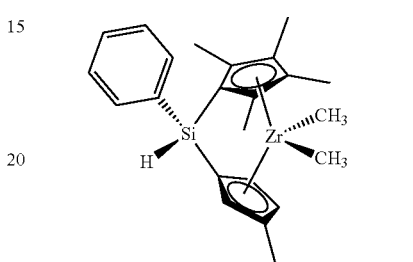
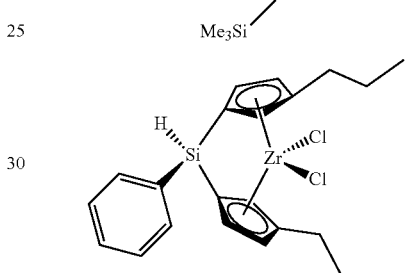
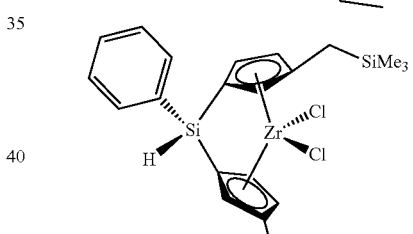
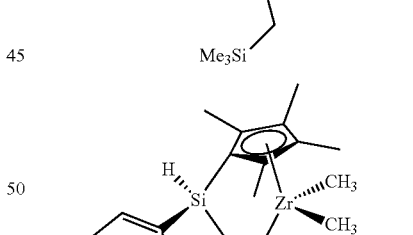
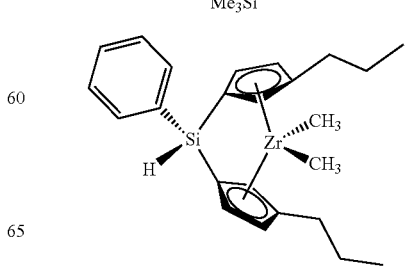

-continued

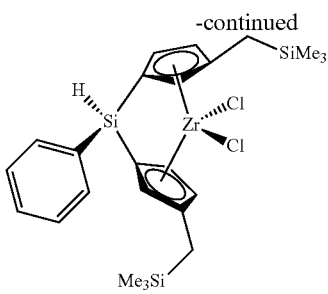

In at least one embodiment, a catalyst system includes a catalyst compound represented by Formula (I) or Formula (II) and a second catalyst compound that is a bridged or unbridged metallocene catalyst compound different than the catalyst compound represented by Formula (I) or Formula (II).

The second catalyst compound may be an unbridged metallocene catalyst compound represented by the formula: $Cp^A Cp^B M'X'_n$. M' is selected from Groups 3 through 12 atoms and lanthanide Group atoms. X' is an anionic leaving group. n is 0 or an integer from 1 to 4. Each $Cp^A$ and $Cp^B$ is independently selected from cyclopentadienyl ligands and ligands isolobal to cyclopentadienyl. One or both $Cp^A$ and $Cp^B$ may contain heteroatoms. One or both $Cp^A$ and $Cp^B$ may be substituted by one or more R" groups. Each R" is independently selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkyl thio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

One or both $Cp^A$ and $Cp^B$ may be selected from cyclopentadienyl, indenyl, fluorenyl, benzindenyl, fluorenyl, octahydrofluorenyl, phenanthrindenyl, 3,4-benzofluorenyl, 9-phenylfluorenyl, 7-H-dibenzofluorenyl, and hydrogenated versions thereof.

In at least one embodiment, the second catalyst compound is a bridged metallocene catalyst compound represented by the formula: $Cp^A(A)Cp^B M'X'_n$. $Cp^A$, $Cp^B$, M', X' and n are as described above. One or both $Cp^A$ and $Cp^B$ may be substituted by one or more R" groups. Each R" is as described above. (A) is a bridging group containing at least one Group 13, 14, 15, or 16 element. (A) may be selected from P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR'. R' is hydrogen or a $C_1$-$C_{20}$ containing hydrocarbyl, substituted hydrocarbyl, halocarbyl, substituted halocarbyl, silylcarbyl or germylcarbyl or two or more adjacent R' may join to form a substituted or unsubstituted, saturated, partially unsaturated or aromatic, cyclic or polycyclic ring. In at least one embodiment, (A) is R'$_2$SiSiR'$_2$ or R'$_2$SiOSiR'$_2$.

The second catalyst compound may be one or more of:

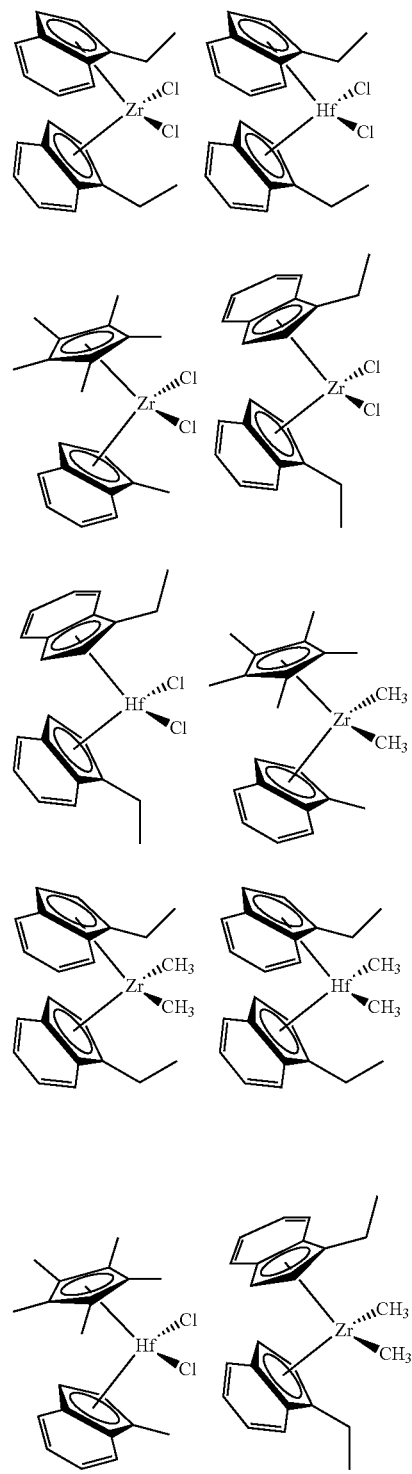

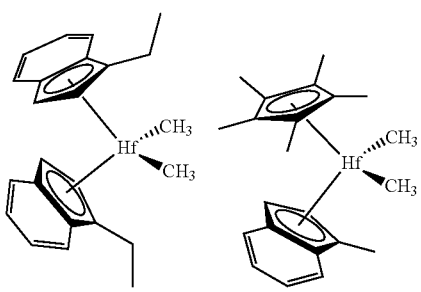
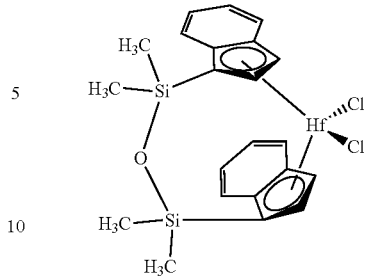

The second catalyst compound may be one or more of:

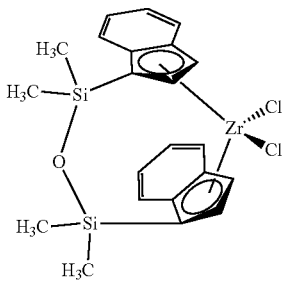

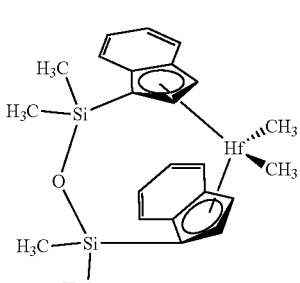

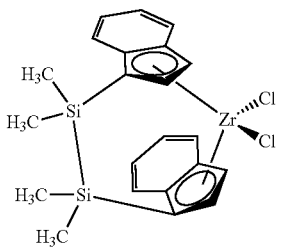

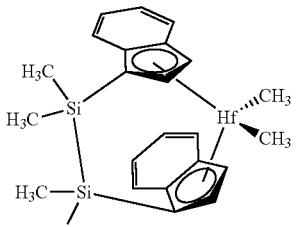

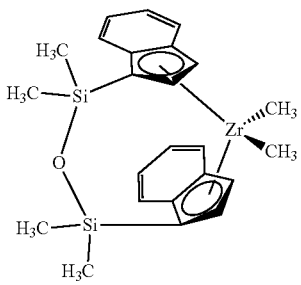

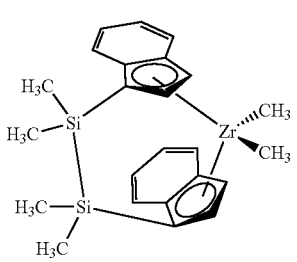

The present disclosure further provides catalyst systems comprising an activator and a support material. The present disclosure further provides methods of polymerizing olefins to produce a polyolefin composition (e.g., a resin) by contacting olefins with a catalyst system comprising Formula (I) or Formula (II).

A polyolefin composition may be a multi-modal polyolefin composition comprising a high molecular weight fraction that is greater than about 10 wt % comonomer, such as hexene. The high molecular weight fraction is produced by the catalyst compound represented by Formula (I) or Formula (II). In at least one embodiment, the high molecular weight fraction comprises about 15 wt % comonomer or more.

Catalyst systems and methods of the present disclosure may include a second catalyst compound that is an unbridged metallocene catalyst compound represented by the formula: $Cp^A Cp^B MX_n$ where each $Cp^A$ and $Cp^B$ is indenyl and is represented by the Formula (III'):

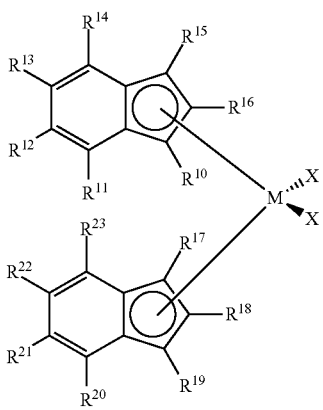

(III')

M is a group 4 metal. Each X is independently a halide or C1-C50 substituted or unsubstituted hydrocarbyl, hydride, amide, alkoxide, sulfide, phosphide, halide, diene, amine, phosphine, ether, or a combination thereof, or two Xs are joined together to form a metallocycle ring, or two Xs are joined to form a chelating ligand, a diene ligand, or an alkylidene. Each of $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ is independently hydrogen, a hydrocarbyl group, a substituted hydrocarbyl group, or a heteroatom group.

In at least one embodiment, in any of the processes described herein, one catalyst compound is used, e.g., the catalyst compounds are not different. For purposes of the present disclosure one catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes if this disclosure, e.g., rac-dimethylsilylbis(2-methyl 4-phenyl)hafnium dimethyl is considered to be the same as meso-dimethylsilylbis(2-methyl 4-phenyl)hafnium dimethyl.

In at least one embodiment, two or more different catalyst compounds are present in the catalyst system used herein. In at least one embodiment, two or more different catalyst compounds are present in the reaction zone where the process(es) described herein occur. When two transition metal catalysts are used in one reactor as a mixed catalyst system, the two transition metal compounds are preferably chosen such that the two are compatible. Any suitable screening method, such as by $^1$H or $^{13}$C NMR, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The catalyst compound represented by Formula (I) or Formula (II) and the second catalyst compound may be used in any ratio (A:B). The catalyst compound represented by Formula (I) or Formula (II) may be (A) if the second catalyst compound is (B). Alternatively, the catalyst compound represented by Formula (I) or Formula (II) may be (B) if the second catalyst compound is (A). Preferred molar ratios of (A) a transition metal compound to (B) a transition metal compound fall within the range of (A:B) about 1:1000 to about 1000:1, such as between about 1:100 and about 500:1, such as between about 1:10 and about 200:1, such as between about 1:1 and about 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two catalyst compounds, where both are activated with the same activator, useful mole percents, based upon the molecular weight of the catalyst compounds, are between about 10 to about 99.9% of (A) to about 0.1 and about 90% of (B), such as between about 25 and about 99% (A) to about 0.5 and about 50% (B), such as between about 50 and about 99% (A) to about 1 and about 25% (B), such as between about 75 and about 99% (A) to about 1 to about 10% (B).

Methods to Prepare the Catalyst Compounds

Synthesis of Si(H) Bridged Cyclopendienyl Ligands and their Metal Complexes

Silyl(hydride) bridged cyclopentadienyl ligands of type R'(H)Si(R"CpH)2 (where R'=Me, Ph; R"=n-propyl, Me3SiCH2-) were synthesized quantitatively by direct salt metathesis reaction between R'(H)SiCl2 and two equivalents of lithium-R"-cyclopendienyl in tetrahydrofuran solvent at ambient temperature (Scheme 1). The structures of all four compounds were confirmed by 1H NMR spectroscopy. Because the asymmetric chemical environment at Si(H) breaks the symmetry of the compounds, the NMR spectrum shows an increased number of signals or unresolved multiplets with appropriate proton integrations. Si—H resonance of these compounds shifts from δ=3.68 ppm to 4.56 ppm, suggesting that Si(H) hydride is sensitive to electronic and steric environments. Cyclopentadienyl Si(H) ligand can be synthesized by a one or two step synthetic protocol (Scheme 1). Electron rich, sterically encumbered cyclopentadienyl group (Me4Cp) is bonded to a Si(H) center at milder reaction conditions to prevent Si—Cl reduction. Therefore, the electron rich and sterically encumbered tetramethylcyclopentadienyl group was bonded to a Si(H) center at milder conditions by treating Me(H)SiCl2 with Li(Me4Cp) in tetrahydrofuran solvent, and subsequent reaction with Me3SiCH2Cp-Li yielded Me(H)Si(Me4CpH)(Me3SiCH2CpH) in moderate (56.8%) yield (Scheme 1). The Si(H) proton appeared as multiplets (δ=4.67-4.72 ppm) in 1H NMR spectrum. All other peak assignments and integration values are further supporting the structural interpretation of the ligands.

Scheme 1.
General synthetic route for Si(II)-bridged) cyclopentadienyl
ligands (where R' = Me, Ph and R" = Pr, ——(CH2SiMe3).

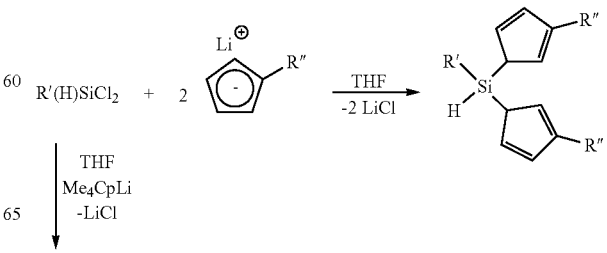

-continued

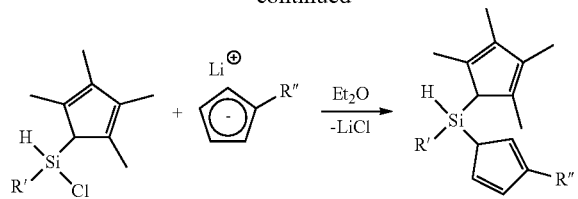

The above synthesized ligands are conveniently deprotonated with appropriate equivalents or two equivalents of n-butyl lithium at −25° C., and all the corresponding lithium salts were thoroughly characterized by $^1$H NMR spectroscopy (Scheme 2).

Scheme 2.
General snythetic route for Si(H)-bridged metallocenes
(where M = Hf, Z; R' = Me, Ph; R'' = n-Pr, —CH$_2$SiMe$_3$;
R$_1$ = R$_3$ = R$_4$ = Me, H; R$_2$ = Me, n-Pr, —CH$_2$SiMe$_3$).

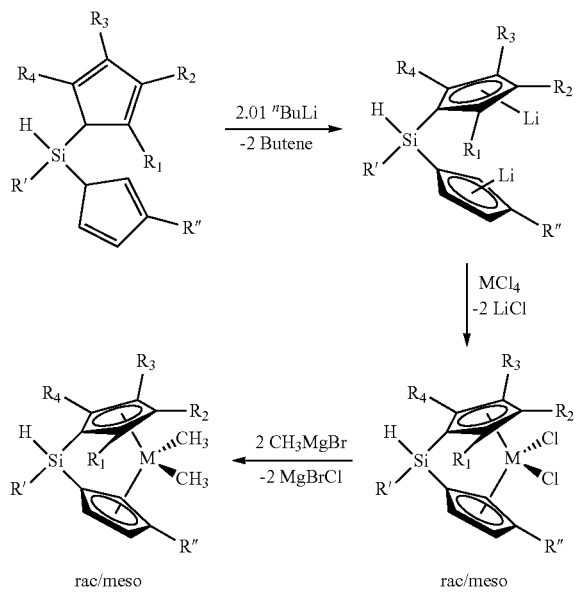

The absence of two cyclopentadienyl protons at 3.2-3.6 ppm further supports the compound's formation. The synthesized lithium salt of bridged cyclopentadienyl ligands are excellent precursors for metallocene synthesis. A salt elimination route has been adapted to synthesize all the reported hafnocene and zirconocene dichloride derivatives by treating an equimolar ratio of ligand precursor or lithium salt of bridged cyclopentadienyl ligands with MCl4 (M=Hf or Zr) at milder conditions. The corresponding dimethyl metallocenes (1-6) were synthesized using a stoichiometric amount or two equivalents of a MeMgBr solution at −25° C. (Scheme 2). Catalyst compounds of structures 1-6 were assigned by 1H NMR spectra.

Activators

Catalyst systems of the present disclosure may have one or more activators. The terms "cocatalyst" and "activator" are used herein interchangeably and are defined to be any compound which can activate any one of the catalyst compounds described above by converting the neutral catalyst compound to a catalytically active catalyst compound cation.

The supported catalyst systems may be formed by combining the above two or more metal catalyst components with activators in any manner known from the literature including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators

The supported catalyst systems may be formed by combining the above catalysts with activators in any manner known from the literature including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators. For descriptions of useful activators, please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Optional Scavengers or Co-Activators

In addition to these activator compounds, catalyst systems of the present disclosure may include scavengers or co-activators. Scavengers or co-activators include aluminum alkyl or organoaluminum compounds, for example, trimethylaluminum, triethylaluminum, triisobutylaluminum, tri-n-hexylaluminum, tri-n-octylaluminum, and diethyl zinc.

Optional Support Materials

In at least one embodiment, a catalyst system comprises an inert support material. The supported material may be a porous support material, for example, talc, and inorganic oxides. Other support materials include zeolites, clays, organoclays, or any other organic or inorganic support material and the like, or mixtures thereof.

In at least one embodiment, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. In at least one embodiment, the support material is selected from $Al_2O_3$, $ZrO_2$, $SiO_2$, $SiO_2/Al_2O_2$, or mixtures thereof. The supported material may be fluorided.

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine-containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, $NH_4HF_2$, and combinations thereof. In at least one embodiment, ammonium hexafluorosilicate and ammonium tetrafluoroborate are used.

It is preferred that the support material, most preferably an inorganic oxide, has a surface area between about 10 and about 700 m$^2$/g, pore volume between about 0.1 and about 4.0 cc/g and average particle size between about 5 and about 500 m. In at least one embodiment, the surface area of the support material is between about 50 and about 500 m$^2$/g, pore volume between about 0.5 and about 3.5 cc/g and average particle size between about 10 and about 200 µm. The surface area of the support material may be between about 100 and about 400 m²/g, pore volume between about 0.8 and about 3.0 cc/g and average particle size between about 5 and about 100 µm. The average pore size of the support material may be between about 10 and about 1000 Å, such as between about 50 and about 500 Å, such as between about 75 and about 350 Å. In at least one embodiment, the support material is a high surface area, amorphous silica (surface area=300 m²/gm; pore volume of 1.65 cm³/gm). Non-limiting example silicas are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at between about 100° C. and about 1000° C., such as at least about 600° C. When the support material is silica, it is heated to at least 200° C., such as between about 200° C. and about 850° C., such as about 600° C.; and for a time between about 1 minute and about 100 hours, between about 12 hours and about 72 hours, or between about 24 hours and about 60 hours. The calcined support material should have at least some reactive hydroxyl (OH) groups to produce supported catalyst systems of the present disclosure. The calcined support material is then contacted with at least one polymerization catalyst system comprising, for example, at least one catalyst compound and an activator.

The support material, having reactive surface groups, typically hydroxyl groups, is slurried in a non-polar solvent and the resulting slurry is contacted with a solution of at least one catalyst compound, for example one or two catalyst compounds, and an activator. In at least one embodiment, the slurry of the support material is first contacted with the activator for a period of time between about 0.5 hours and about 24 hours, such as between about 2 hours and about 16 hours, or between about 4 hours and about 8 hours. The solution of the catalyst compound is then contacted with the isolated support/activator. In at least one embodiment, the supported catalyst system is generated in situ. In at least one embodiment, the slurry of the support material is first contacted with the catalyst compound for a period of time between about 0.5 hours and about 24 hours, such as between about 2 hours and about 16 hours, or between about 4 hours and about 8 hours. The slurry of the supported catalyst compound(s) is then contacted with the activator solution.

The mixture of the catalyst, activator and support may be heated to between about 0° C. and about 70° C., such as between about 23° C. and about 60° C., for example room temperature. Contact times may be between about 0.5 hours and about 24 hours, such as between about 2 hours and about 16 hours, or between about 4 hours and about 8 hours.

Suitable non-polar solvents are materials in which all of the reactants used herein, e.g., the activator, and the catalyst compound, are at least partially soluble and which are liquid at reaction temperatures. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

Polymerization Processes

Embodiments of the present disclosure include polymerization processes where monomer (such as ethylene or propylene), and optionally comonomer, are contacted with a catalyst system comprising at least one catalyst compound and an activator, as described above. The at least one catalyst compound and activator may be combined in any order, and are combined typically prior to contact with the monomer.

Monomers useful herein include substituted or unsubstituted C2 to C40 alpha olefins, preferably C2 to C20 alpha olefins, preferably C2 to C12 alpha olefins, preferably ethylene, propylene, butene, pentene, hexene, heptene, octene, nonene, decene, undecene, dodecene and isomers thereof. In a preferred embodiment, olefins include a monomer that is propylene and one or more optional comonomers comprising one or more ethylene or C4 to C40 olefin, preferably C4 to C20 olefin, or preferably C6 to C12 olefin. The C4 to C40 olefin monomers may be linear, branched, or cyclic. The C4 to C40 cyclic olefin may be strained or unstrained, monocyclic or polycyclic, and may include one or more heteroatoms and/or one or more functional groups. In another preferred embodiment, olefins include a monomer that is ethylene and an optional comonomer comprising one or more of C3 to C40 olefin, preferably C4 to C20 olefin, or preferably C6 to C12 olefin. The C3 to C40 olefin monomers may be linear, branched, or cyclic. The C3 to C40 cyclic olefins may be strained or unstrained, monocyclic or polycyclic, and may include heteroatoms and/or one or more functional groups.

Exemplary C2 to C40 olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and substituted derivatives thereof, preferably norbornene, norbornadiene, and dicyclopentadiene.

In at least one embodiment, one or more dienes are present in a polymer produced herein at up to about 10 wt %, such as between about 0.00001 and about 1.0 wt %, such as between about 0.002 and about 0.5 wt %, such as between about 0.003 and about 0.2 wt %, based upon the total weight of the resin. In at least one embodiment, about 500 ppm or less of diene is added to the polymerization, such as about 400 ppm or less, such as about 300 ppm or less. In at least one embodiment, at least about 50 ppm of diene is added to the polymerization, or about 100 ppm or more, or 150 ppm or more.

Diolefin monomers include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Non-limiting examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Non-limiting example cyclic dienes include cyclopentadienyl, vinylnorbornene, norbornadiene, ethylidene norbornene, divinylbenzene, dicyclopentadiene or higher ring containing diolefins with or without substituents at various ring positions.

In at least one embodiment, where butene is the comonomer, the butene source may be a mixed butene stream comprising various isomers of butene. The 1-butene monomers are expected to be preferentially consumed by the polymerization process as compared to other butene monomers. Use of such mixed butene streams will provide an economic benefit, as these mixed streams are often waste streams from refining processes, for example, C4 raffinate streams, and can therefore be substantially less expensive than pure 1-butene.

Polymerization processes of the present disclosure can be carried out in any suitable manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is preferably a process where at least about 90 wt % of the product is soluble in the reaction media.) A bulk homogeneous process is particularly preferred. (A bulk process is preferably a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is used and monomers are polymerized on the supported catalyst particles. At least 95 wt % of polymer products derived from the supported catalyst are in granular form as solid particles (not dissolved in the diluent). Methods of the present disclosure may include introducing the first catalyst compound represented by Formula (I) or Formula (II) into a reactor as a slurry.

Suitable diluents/solvents for polymerization include non-coordinating, inert liquids. Non-limiting examples include straight and branched-chain hydrocarbons, such as isobutane, butane, pentane, isopentane, hexane, isohexane, heptane, octane, dodecane, and mixtures thereof, cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4 to C10 alkanes, chlorobenzene, and aromatic and alkylsubstituted aromatic compounds, such as benzene, toluene, mesitylene, and xylene. Suitable solvents also include liquid olefins which may act as monomers or comonomers including, but not limited to, ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, or mixtures thereof; cyclic and alicyclic hydrocarbons, such as cyclohexane, cycloheptane, methylcyclohexane, methylcycloheptane, or mixtures thereof. In another embodiment, the solvent is not aromatic, and aromatics are present in the solvent at less than about 1 wt %, such as less than about 0.5 wt %, such as about 0 wt % based upon the weight of the solvents.

In at least one embodiment, the feed concentration of the monomers and comonomers for the polymerization is about 60 vol % solvent or less, preferably about 40 vol % or less, or about 20 vol % or less, based on the total volume of the feedstream. Preferably the polymerization is run in a bulk process.

Preferred polymerizations can be run at any temperature and/or pressure suitable to obtain the desired polyolefins. Typical temperatures and/or pressures include a temperature between about 0° C. and about 300° C., such as between about 20° C. and about 200° C., such as between about 35° C. and about 150° C., such as between about 40° C. and about 120° C., such as between about 45° C. and about 80° C.; and at a pressure between about 0.35 MPa and about 10 MPa, such as between about 0.45 MPa and about 6 MPa, or preferably between about 0.5 MPa and about 4 MPa.

In a typical polymerization, the run time of the reaction is up to about 300 minutes, such as between about 5 and about 250 minutes, such as between about 10 and about 120 minutes.

In at least one embodiment, hydrogen is present in the polymerization reactor at a partial pressure of between about 0.001 and 50 psig (0.007 to 345 kPa), such as between about 0.01 and about 25 psig (0.07 to 172 kPa), such as between about 0.1 and 10 psig (0.7 to 70 kPa).

In at least one embodiment, little or no alumoxane is used in the process to produce the polymers. Preferably, alumoxane is present at zero mol %. Alternatively, the alumoxane is present at a molar ratio of aluminum to transition metal of the catalyst represented by Formula (I) or Formula (II) less than about 500:1, such as less than about 300:1, such as less than about 100:1, such as less than about 1:1.

In a preferred embodiment, little or no scavenger is used in the process to produce the polyolefin composition. Preferably, scavenger (such as tri alkyl aluminum) is present at zero mol %. Alternatively, the scavenger is present at a molar ratio of scavenger metal to transition metal of the catalyst represented by Formula (I) or Formula (II) of less than about 100:1, such as less than about 50:1, such as less than about 15:1, such as less than about 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic or alicyclic hydrocarbons, such as cyclohexane, cycloheptane, methylcyclohexane, methylcycloheptane, or mixtures thereof; preferably where aromatics are present in the solvent at less than 1 wt %, preferably less than 0.5 wt %, preferably at 0 wt % based upon the weight of the solvents); 4) wherein the catalyst system used in the polymerization comprises less than 0.5 mol % alumoxane, preferably 0 mol % alumoxane. Alternatively, the alumoxane is present at a molar ratio of aluminum to transition metal of the catalyst represented by Formula (I) or Formula (II) less than 500:1, preferably less than 300:1, preferably less than 100:1, preferably less than 1:1; 5) the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g., present at zero mol %. Alternatively, the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone", also referred to as a "polymerization zone", is a vessel where polymerization takes place, for example a batch reactor. When multiple reactors are used in either series or parallel configuration, each reactor is considered as a separate polymerization zone. For a multistage polymerization in both a batch reactor and a continuous reactor, each polymerization stage is considered as a separate polymerization zone. In a preferred embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain transfer agents may be alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl, heptyl, octyl or an isomer thereof) or a combination thereof, such as diethyl zinc, methylalumoxane, trimethylaluminum, triisobutylaluminum, trioctylaluminum, or a combination thereof.

Gas phase polymerization: Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization:

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process should be operated above the reaction diluent critical temperature and pressure. Preferably, a hexane or an isobutane medium is employed.

Polyolefin Products

The present disclosure also relates to polyolefin compositions, such as resins, produced by the catalyst compound represented by Formula (I) or Formula (II) and the methods described herein.

In at least one embodiment, a process includes utilizing the catalyst compound represented by Formula (I) or Formula (II) to produce propylene homopolymers or propylene copolymers, such as propylene-ethylene and/or propylene-alphaolefin (preferably C3 to C20) copolymers (such as propylene-hexene copolymers or propylene-octene copolymers) having an Mw/Mn of greater than about 1, such as greater than about 2, such as greater than about 3, such as great than about 4.

In at least one embodiment, a process includes utilizing the catalyst compound represented by Formula (I) or Formula (II) to produce olefin polymers, preferably polyethylene and polypropylene homopolymers and copolymers. In at least one embodiment, the polymers produced herein are homopolymers of ethylene or copolymers of ethylene preferably having between about 0 and 25 mole % of one or more C3 to C20 olefin comonomer (such as between about 0.5 and 20 mole %, such as between about 1 and about 15 mole %, such as between about 3 and about 10 mole %). Olefin comonomers may be C3 to C12 alpha-olefins, such as one or more of propylene, butene, hexene, octene, decene, or dodecene, preferably propylene, butene, hexene, or octene. Olefin monomers may be one or more of ethylene or C4 to C12 alphaolefin, preferably ethylene, butene, hexene, octene, decene, or dodecene, preferably ethylene, butene, hexene, or octene.

In a preferred embodiment, the monomer is ethylene and the comonomer is hexene, preferably at least about 10 mole % hexene (comonomer content), such as at least about 15 mole % hexene.

Polymers produced herein may have an Mw of between about 5,000 and about 1,000,000 g/mol (such as between about 25,000 and about 750,000 g/mol, such as between about 50,000 and about 500,000 g/mol), and/or an Mw/Mn of between about 1 and about 40 (such as between about 1.2 and about 20, such as between about 1.3 and about 10, such as between about 1.4 and about 5, such as between about 1.5 and about 4, such as between about 1.5 and about 3).

In a preferred embodiment the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al., J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In another embodiment, the polymer produced herein has two peaks in the TREF measurement. Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicate a bi-modal composition distribution (CD). TREF analysis is done using a CRYSTAF-TREF 200+ instrument from Polymer Char, S. A., Valencia, Spain. The principles of TREF analysis and a general description of the particular apparatus to be used are given in the article Monrabal, B.; del Hierro, P. Anal. Bioanal. Chem. (2011) Vol. 399, page 1557. An alternate method for TREF measurement can be used if the method above does not show two peaks, i.e., see B. Monrabal, "Crystallization Analysis Fractionation: A New Technique for the Analysis of Branching Distribution in Polyolefins," Journal of Applied Polymer Science, Vol. 52, pages 491-499 (1994).

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at between about 10 and about 99 wt %, based upon the weight of total polymers in the blend, such as between about 20 and about 95 wt %, such as between about 30 and about 90 wt %, such as between about 40 and about 90 wt %, such as between about 50 and about 90 wt %, such as between about 60 and about 90 wt %, such as between about 70 and about 90 wt %.

Blends of the present disclosure may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

Blends of the present disclosure may be formed using conventional equipment and methods, such as by dry blending the individual components, such as polymers, and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; mixtures thereof, and the like.

In at least one embodiment, a polyolefin composition, such as a resin, that is a multi-modal polyolefin composition comprises a low molecular weight fraction and/or a high molecular weight fraction. The low molecular weight fraction may be a high density fraction. The high molecular weight fraction may be a low density fraction. In at least one embodiment, the high molecular weight fraction is produced by the catalyst compound represented by Formula (I) or Formula (II). The low molecular weight fraction may be produced by a second catalyst compound that is a bridged or unbridged metallocene catalyst compound different than the catalyst compound represented by Formula (I) or Formula (II), as described above. The high molecular weight fraction may be polypropylene or polyethylene, such as linear low density polyethylene, or copolymers thereof. The low molecular weight fraction may be polypropylene or polyethylene, or copolymers thereof.

In at least one embodiment, the high molecular weight fraction produced by the catalyst compound represented by Formula (I) or Formula (II) has a high comonomer content between about 10 wt % and about 20 wt %, such between about 11 wt % and about 20 wt %, such as between about 12 wt % and about 18 wt %, such as between about 13 wt % and about 16 wt %, such as between about 14 wt % and about 16 wt %, for example about 15 wt %.

Films

Any of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion techniques, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 to 50 μm may be suitable. Films intended for packaging are usually from 10 to 50 μm thick. The thickness of the sealing layer is typically 0.2 to 50 m. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

EXPERIMENTAL

The following abbreviations may be used below: eq. means equivalents.

Melt index (MI) also referred to as 12, reported in dg/min, is determined according to ASTM D1238, 190° C., 2.16 kg load.

High load melt index (HLMI) also referred to as 121, reported in dg/min, is determined according to ASTM D1238, 190° C., 21.6 kg load.

Melt index ratio (MIR) is MI divided by HLMI as determined by ASTM D1238.

All reagents were obtained from Sigma Aldrich (St. Louis, Mo.) and used as obtained, unless stated otherwise. All solvents were anhydrous. All reactions were performed under an inert nitrogen atmosphere, unless otherwise stated. All deuterated solvents were obtained from Cambridge Isotopes (Cambridge, Mass.) and dried over 3 Angstrom molecular sieves before use.
Products were Characterized as Follows:
$^1$H NMR Unless otherwise indicated, 1H NMR data was collected at room temperature in a 5 mm probe using a Bruker NMR spectrometer operating with a 1H frequency of 400 or 500 MHz. Data was recorded using a 30° flip angle RF pulse, 8 scans, with a delay of 5 seconds between pulses. Samples were prepared using approximately 5-10 mg of compound dissolved in approximately 1 mL of an appropriate deuterated solvent, as listed in the experimental examples. Samples are referenced to residual proton of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers was recorded in a 5 or 10 mm probe on the spectrometer at 120° C. using a $d_2$-1,1,2,2-tetrachloroethane solution prepared from approximately 20 mg of polymer and 1 mL of solvent. Unless stated otherwise, data was recorded using a 30° flip angle RF pulse, 120 scans, with a delay of 5 seconds between pulses.

All reactions were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), methylmagnisium bromide (3.0 M solution in diethyl ether), dichloromethylsilane (Me(H)SiCl2) and dichlorophenylsilane (Ph(H)SiCl$_2$) were purchased from Sigma-Aldrich, and hafnium tetrachloride (HfCl$_4$) 99+%, was purchased from Strem Chemicals and used as received. Lithium-n-propylcyclopentadienide was procured from Boulder Scientific.
Example Preparation of Supports:
Silica Support (sMAO):

Silica (Grace Davison D948, 40.7 g) is calcined at 600° C. then slurried in 200 mL of toluene. MAO (71.4 g of a 30 wt % toluene solution, 351.1 mmol of Al) is added slowly to the slurry. The slurry is then heated to 80° C. and stirred for 1 hr. The slurry is filtered, washed three times with 70 mL of toluene and once with pentane. The solid is dried under vacuum overnight to give a 60.7 g amount of free flowing white solid. Alternatively, a fluorided support may be used as a support. A fluorided support may be prepared as follows:
Fluorided Silica Support (F-sMAO):

1.18 g (NH$_4$)$_2$SiF$_6$ is dissolved in 7.00 g water in a 20 ml glass vial. 50 g silica (Grace Davison D948) and 200 g of toluene are combined in a 250 ml Celstir™. Under vigorous stirring, the aqueous solution of (NH$_4$)$_2$SiF$_6$ is added via a syringe to the toluene slurry. The mixture is allowed to stir at room temperature for 2.5 h. The milky slurry is filtered through a 500 ml Optichem disposable polyethylene frit (40 micron), rinsed with 200 g pentane for three times, then dried in air overnight to yield a white, free-flowing solid. The solid is transferred into a tube furnace, and is heated to 200° C. under constant nitrogen flow (temperature program: 25° C./h ramped to 150° C.; held at 150° C. for 4 hours; 50° C./h ramped to 200° C.; held at 200° C. for 4 hours; cooled down to room temperature). 46 g of fluorided silica is collected after the calcination. Calculated F-loading: 0.8 mmol/g (F-loading=mmol of F/gram of added raw silica).

MAO (37.6 g of 30% wt in toluene) is added to a 250 ml celstir along with 100 mL of toluene. 29.9 g fluorided silica prepared in the previous step is added to the slurry in 5 g increments. The reaction stirred for 10 minutes at room temperature and is then heated to 100° C. for 3 hours. The solid is filtered, washed twice with 80 mL of toluene, washed twice with pentane, and dried under vacuum overnight. 39.6 g of free flowing white solid is collected.
Example Preparation of Supported Catalysts:
Silica Supported Catalyst In a 20 ml glass vial sMAO (0.495 g) and toluene (3.0 g) are combined. A toluene solution (1.0 gram) containing a catalyst represented by Formula (I) or Formula (II) (18.8 mol) is added to the glass vial via a pipette. The glass vial is capped with a Teflon-lined cap and vortexed at room temperature for about 90 min. The resulting slurry is filtered through a 18 mL polyethylene frit (10 micron) and rinsed with toluene (2×, 3 g), followed by rinsing three times with pentane (3×, 1.4 g). The collected solid is dried under vacuum for about 40 minutes. Supported catalyst is recovered. Calculated catalyst loading: 38 μmol/g (catalyst loading=μmol of catalyst/gram of added sMAO).
Fluorided-Silica Supported Catalyst In a 20 ml glass vial F-sMAO (0.493 g) and toluene (0.493 g) are combined. 1.0 gram toluene solution containing a catalyst represented by Formula (I) or Formula (II) (18.8 μmol) is added to the glass vial via a pipette. The remaining steps of the preparation are substantially the same as described for silica supported catalyst above. Catalyst supported on fluorided silica is collected. Calculated catalyst loading: 38 µmol/g.

1

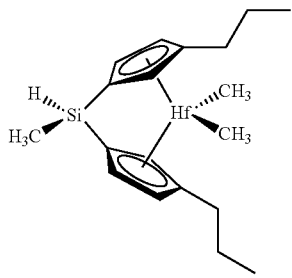

2

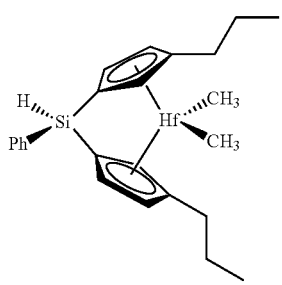

3

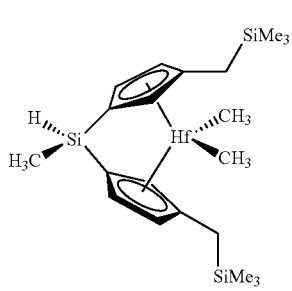

4

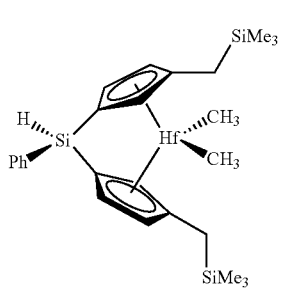

5

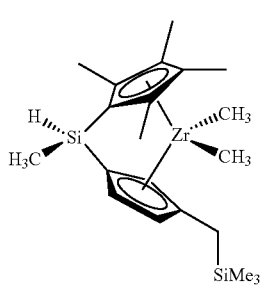

6

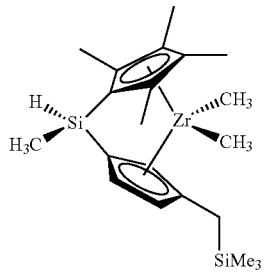

Synthesis of Bis(n-propylcyclopentadienyl)methylsilane, Me(H)Si(n-PrCpH)2

A neat Me(H)SiCl2 (20.0 g, 173.9 mmol) was dissolved in 300 mL of THF and cooled to −25° C., and to this a solid lithium-n-propylcyclopentadienyl (40.08 g, 351.2 mmol) was slowly added over a period of 10-15 minutes. The resulting mixture was stirred 18 hours at room temperature. Volatiles from the reaction mixture were removed in vacuo, and further triturated with hexane. The crude materials were then extracted into hexane and followed by solvent removal afforded a thick orange-yellow oil of Me(H)Si(n-PrCpH)2 along with 0.5 equivalent of hexane in 50.08 g (95.5%) yield.

Synthesis of Lithium bis(n-propylcyclopentadienyl)methylsilane, Me(H)Si(n-PrCp)2Li2

A neat Me(H)Si(n-PrCpH)2.0.5hexane (58.08 g, 166.1 mmol) was dissolved in 400 mL of THF and cooled to −25° C., and to this a hexane solution of n-butyllithium (134.2 mL, 335.5 mmol, 2.02 equivalents) was added over a period of 45-60 minutes. The resulting mixture was gradually warmed to room temperature and continuously stirred 18 hours. Volatiles from the reaction mixture were removed in vacuo, and triturated with hexane to evaporate trace of THF. The crude materials were thoroughly washed with hexane to remove any soluble impurities, and dried under vacuum to give an off-white solid of Me(H)Si(n-PrCp)2Li2 in 44.8 g (99.8%) yield.

Synthesis of Rac-meso-methylsilyl-bis(n-propylcyclopentadienyl)hafnium Dichloride, Me(H)Si(n-PrCp)2HfCl2

A solid Me(H)Si(n-PrCp)2Li2 (49.52 g, 183.2 mmol) was slurried in 600 mL of diethyl ether and cooled to −25° C., and to this a solid HfCl4 (58.584 g, 183.2 mmol) was added over a period of 15-20 minutes. The resulting mixture was stirred 48 hours at room temperature. Insoluble materials were filtered through celite filtration and volatiles were removed in vacuo to give a yellowish-red oil of Me(H)Si(n-PrCp)2HfCl2 in 87.2 g (94.1%) yield. The 1H NMR spectrum of final material revealed that multiple rac/meso isomers because of asymmetry chemical environment at silicon center.

Catalyst 1: Synthesis of Rac-meso-methylsilyl-bis(n-propylcyclopentadienyl)hafnium dimethyl, Me(H)Si(n-PrCp)2HfMe2

A neat Me(H)Si(n-PrCp)2HfCl2 (87.188 g, 172.4 mmol) was dissolved in 600 mL of diethyl ether and cooled to −25°

C., and to this an ethereal solution of MeMgBr (116.1 mL, 348.2 mmol) was added over a period of 45-60 minutes. The resulting mixture was gradually brought to room temperature and continuously stirred 18 hours. Volatiles were removed in vacuo and triturated with hexane. The crude materials were extracted into hexane and solvent removal afforded a thick brownish-yellow oil of Me(H)Si(n-PrCp)2HfMe2 in 72.3 g (90.2%) yield. The 1H NMR spectrum of final material revealed multiple rac/meso isomers because of asymmetrical chemical environment at the chiral silicon atom.

Synthesis of Bis(n-propylcyclopentadienyl)phenyllsilane, Ph(H)Si(n-PrCpH)2

A neat Ph(H)SiCl2 (2.0 g, 11.29 mmol) was dissolved in 20 mL of THF and cooled to −25° C., and to this a solid lithium-n-propylcyclopentadienyl (2.60 g, 22.81 mmol) was slowly added over a period of 3-5 minutes. The resulting mixture was stirred overnight at room temperature to ensure completion of the reaction. Volatiles from the reaction mixture were removed in vacuo, and further triturated with hexane. The crude materials were then extracted into hexane and followed by solvent removal afforded a viscous orange-yellow oil of Ph(H)Si(n-PrCpH)2 in 3.41 g (94.3%) yield.

Synthesis of Lithium bis(n-propylcyclopentadienyl)phenylsilane, Ph(H)Si(n-PrCp)2Li2

A neat Ph(H)Si(n-PrCpH)2 (3.41 g, 10.64 mmol) was dissolved in 30 mL of THF and cooled to −25° C., and to this a hexane solution of n-butyllithium (8.6 mL, 21.5 mmol, 2.02 equivalents) was added over a period of 5-10 minutes. The resulting mixture was gradually warmed to room temperature and continuously stirred 18 hours. Volatiles from the reaction mixture were removed in vacuo, and triturated with pentane to evaporate trace of THF. The crude materials were thoroughly washed with pentane to remove any soluble impurities, and dried under vacuum to give an off-white solid of Ph(H)Si(n-PrCp)2Li2 in 3.68 g with trace of pentane (100%) yield.

Synthesis of Rac-meso-phenylsilyl-bis(n-propylcyclopentadienyl)hafnium dichloride, Ph(H)Si(n-PrCp)2HfCl2

A solid Ph(H)Si(n-PrCp)2Li2 (3.68 g, 11.1 mmol) was slurried in 60 mL of diethyl ether and cooled to −25° C., and to this a solid HfCl4 (3.54 g, 11.1 mmol) was added over a period of 3-5 minutes. The resulting mixture was stirred 18 hours at room temperature. Insoluble materials were filtered through celite and volatiles were removed in vacuo to give a pale yellow semi-solid of Ph(H)Si(n-PrCp)2HfCl2 in 5.91 g (93.8%) yield. The 1H NMR spectrum of final material revealed that multiple rac/meso isomers because of asymmetry chemical environment at silicon center.

Catalyst 2: Synthesis of Rac-meso-phenylsilyl-bis(n-propylcyclopentadienyl)hafnium dimethyl, Ph(H)Si(n-PrCp)2HfMe2

A neat Ph(H)Si(n-PrCp)2HfCl2 (5.91 g, 10.4 mmol) was dissolved in 60 mL of diethyl ether and cooled to −25° C., and to this an ethereal solution of MeMgBr (7.0 mL, 21.1 mmol) was added over a period of 5-10 minutes. The resulting mixture was gradually brought to room temperature and continuously stirred 18 hours. Volatiles were removed in vacuo and triturated with pentane. The crude materials were extracted into pentane and solvent removal afforded a thick brownish-yellow oil of Ph(H)Si(n-PrCp)2HfMe2 in 4.88 g (89.1%) yield. The 1H NMR spectrum of final material revealed multiple rac/meso isomers because of asymmetrical chemical environment at the chiral silicon atom.

Synthesis of Trimethylsilylmethyl cyclopentadienyl, (Me3SiCH2)CpH

A neat trimethylsilylmethyl trifluoromethanesulfonate (25.0 g, 105.8 mmol) was dissolved in 300 mL of diethyl ether and cooled to −25° C. To this solution, solid potassium cyclopentadienyl (11.14 g, 106.9 mmol) was slowly added over a period of 10-15 minutes. The resulting mixture was stirred overnight at room temperature. Insoluble materials were filtered out. Volatiles from the reaction mixture were carefully removed under dynamic vacuum to avoid evaporating the volatile trimethylsilylmethylcyclopentadienyl, (Me3Si)CH2CpH. The reaction flask (250 mL round bottom flask) and frit with celite were weighed out to calculate yield of the product after extraction. The crude materials were then extracted into pentane (3×50 mL) and used without any further purification. Based on above mathematical method, the yield is calculated as 15.47 g (95.2%). The 1H NMR spectrum was recorded for the crude material to ensure the product formation. 1H NMR (400 MHz, C6D6): δ −0.05 (9H, s, Si—CH3), 1.77 (2H, d, JHH=1.2 Hz, Me3Si—CH2), 2.83 (1H, sex, JHH=1.5 Hz, Cp-CH), 5.80-6.49 (4H, m, Cp-CH) ppm.

Synthesis of Lithium trimethylsilylmethylcyclopentadienyl, Me3SiCH2CpLi

A hexane solution of n-butyl lithium (41.5 mL, 103.8 mmol, 2.5 M solution) was added drop wise to a precooled solution (1:1 mixture of pentane and diethyl ether, 200 mL) of Me3SiCH2CpH (15.47 g, 101.7 mmol) over a period of 40-50 minutes at −25° C. The resulting mixture was gradually brought to room temperature and then continuously stirred overnight. All volatiles from the reaction mixture were removed in vacuo, and then the crude materials were thoroughly washed with pentane. Vacuum dried materials of Me3SiCH2CpLi were obtained as a colorless crystalline solid, in 13.6 g (84.6%) yield. 1H NMR (400 MHz, THF-d8): δ −0.09 (9H, s, Si—CH3), 1.84 (2H, s, Me3Si—CH2), 5.36 (2H, t, JHH=2.6 Hz, Cp-CH), 5.47 (2H, t, JHH=2.6 Hz, Cp-CH) ppm.

Synthesis of Bis(trimethylsilylmethyl cyclopentadienyl)methylsilane, Me(H)Si(Me3SiCH2CpH)2

A solid Me3SiCH2CpLi (5.51 g, 34.9 mmol) was added to the precooled THF (100 mL) solution of Me(H)SiCl2 (2.01 g, 17.4 mmol) at −25° C. The resulting mixture was stirred overnight at room temperature. All volatiles from the reaction mixture were removed in vacuo and triturated with pentane. The crude materials were then extracted into pentane and subsequent solvent removal under vacuum afforded a thick yellow viscous oil of Me(H)Si(Me3SiCH2CpH)2 in 5.9 g (97.4%) yield. 1H NMR (400 MHz, C6D6): δ 0.02-(−)0.10 (21H, m, Si—CH3 and Si—CH3), 1.79-1.86 (4H, m, Me3Si—CH2), 3.31-3.69 (2H, broad multiplets, Cp-CH), 4.25 (1H, bs, Si—H), 6.03-6.89 (6H, m, Cp-CH) ppm.

Synthesis of Lithium bis(trimethylsilylmethyl cyclopentadienyl)methylsilane, Me(H)Si(Me3SiCH2Cp)2Li2

A hexane solution of n-butyllithium (13.72 mL, 34.3 mmol, 2.5 M solution) was added dropwise to a precooled solution of Me(H)Si(Me3SiCH2CpH)2 (5.9 g, 17.0 mmol) in 100 mL of THF over a period of 25-30 minutes at −25° C. The resulting mixture was gradually warmed to room temperature and then continuously stirred overnight. All volatiles from the reaction mixture were removed in vacuo, and triturated with pentane. The crude materials were thoroughly washed with pentane to remove any soluble impurities, and dried under vacuum to obtain the colorless crystalline solid of Me(H)Si(Me3SiCH2Cp)2Li2 in 3.2 g (52.3%) yield. 1H NMR (400 MHz, THF-d8): δ −0.05-(−)0.06 (18H, m, Si—CH3), 0.22-0.32 (3H, m, Si—CH3), 1.90 (4H, s, Me3Si—CH2), 4.89-4.99 (1H, m, Si—H), 5.51-5.60 (2H, m, Cp-CH), 5.66-5.74 (2H, m, Cp-CH), 5.82-5.86 (2H, m, Cp-CH) ppm.

Synthesis of Rac-meso-methylsilyl-bis(trimethylsilylmethyl cyclopentadienyl)hafnium dichloride, Me(H)Si(Me3SiCH2Cp)2HfCl2

A solid HfCl4 (2.818 g, 8.81 mmol) was added to a precooled diethyl ether (50 mL) solution of Me(H)Si(Me3SiCH2Cp)2Li2 (3.16 g, 8.81 mmol) at −25° C. The resulting mixture was stirred overnight at room temperature. Insoluble materials were filtered out and volatiles from the filtrate were removed in vacuo. The resulting materials were dried under vacuum to obtain the yellow crystalline solid of Me(H)Si(Me3SiCH2Cp)2HfCl2 in 4.9 g (93.6%) yield. The 1H NMR spectrum of final material revealed multiple rac/meso isomers because of asymmetric chemical environment at silicon center. 1H NMR (400 MHz, CD2Cl2): δ-0.02-(−)0.04 (18H, m, Si—CH3), 0.62-0.80 (3H, m, Si—CH3), 2.08-2.21 (4H, m, Me3Si—CH2), 5.00-5.11 (1H, m, Si—H), 5.15-5.41 (2H, m, Cp-CH), 5.64-5.90 (2H, m, Cp-CH), 6.18-6.37 (2H, m, Cp-CH) ppm.

Catalyst 3: Synthesis of Rac-meso-methylsilyl-bis(trimethylsilylmethyl cyclopentadienyl)hafnium dimethyl, Me(H)Si(Me3SiCH2Cp)2HfMe2

An ethereal solution of MeMgBr (5.6 mL, 16.66 mmol) was added dropwise to a precooled diethyl ether solution of Me(H)Si(Me3SiCH2Cp)2HfCl2 (4.9 g, 8.3 mmol) over a period of 10-15 minutes at −25° C. The resulting mixture was stirred overnight at room temperature to ensure completion of the reaction. Insoluble materials were filtered through a pad of celite packed frit. All volatiles from the filtrate were removed under vacuum, and then the crude materials were extracted into pentane. Solvent removal in vacuo afforded a sticky yellow material of Me(H)Si(Me3SiCH2Cp)2HfMe2 in 4.0 g (87.1%) yield. The 1H NMR spectrum of final material revealed multiple rac/meso isomers because of asymmetric chemical environment at silicon center. 1H NMR (400 MHz, C6D6): δ −0.17-(−)0.25 (6H, m, Hf—CH3), 0.02-0.05 (18H, m, Si—CH3), 0.18-0.26 (3H, m, Si—CH3), 2.04-2.12 (4H, m, Me3Si—CH2), 4.68-4.79 (1H, m, Si—H), 4.98-5.60 (4H, m, Cp-CH), 6.22-6.30 (2H, m, Cp-CH) ppm.

Synthesis of Bis(trimethylsilylmethyl cyclopentadienyl cyclopentadiene)phenylsilane, Ph(H)Si(Me3SiCH2CpH)2

A solid Me3SiCH2CpLi (746 mg, 4.72 mmol) was added to the precooled THF (15 mL) solution of Ph(H)SiCl2 (418 mg, 2.36 mmol) at −25° C. The resulting mixture was stirred overnight at room temperature. All volatiles from the reaction mixture were removed in vacuo and triturated with pentane. The crude materials were then extracted into pentane and subsequent solvent removal under vacuum afforded a thick yellow viscous oil of Ph(H)Si(Me3SiCH2CpH)2 in 610 mg (64.0%) yield. 1H NMR (400 MHz, C6D6): δ −0.07-0.02 (18H, m, Si—CH3), 1.78 (4H, broad doublet, Me3Si—CH2), 3.03 (1H, broad doublet, Cp-CH), 3.80 (1H, broad doublet, Cp-CH), 4.56 (1H, broad doublet, Si—H), 5.58-6.98 (6H, broad multiplets, Cp-CH), 7.17-7.21 (3H, m, Ar—CH), 7.57 (2H, broad doublet, Ar—CH) ppm.

Synthesis of Lithium bis(trimethylsilylmethyl cyclopentadienyl)phenylsilane, Ph(H)Si(Me3SiCH2Cp)2Li2

A hexane solution of n-butyllithium (1.18 mL, 2.95 mmol, 2.5 M solution) was added dropwise to a precooled solution of Ph(H)Si(Me3SiCH2CpH)2 (593 mg, 1.46 mmol) in 10 mL of THF over a period of 2-3 minutes at −25° C. The resulting mixture was gradually warmed to room temperature and then continuously stirred overnight. All volatiles from the reaction mixture were removed in vacuo, and triturated with pentane. The crude materials were thoroughly washed with pentane to remove any soluble impurities, and dried under vacuum to obtain the colorless crystalline solid of Ph(H)Si(Me3SiCH2Cp)2Li2 in 350 mg (57.0%) yield. 1H NMR (400 MHz, THF-d8): δ-0.04 (18H, s, Si—CH3), 1.90-1.92 (4H, m, Me3Si—CH2), 5.34-5.42 (1H, m, Si—H), 5.52-5.64 (2H, m, Cp-CH), 5.81-5.87 (2H, m, Cp-CH), 5.93-5.97 (2H, m, Cp-CH), 7.03-7.14 (3H, m, Ar—CH), 7.58-7.67 (2H, m, Ar—CH) ppm.

Synthesis of Rac-meso-phenylsilyl-bis(trimethylsilylmethyl cyclopentadienyl) hafnium dichloride, Ph(H)Si(Me3SiCH2Cp)2HfCl2

A solid HfCl4 (213 mg, 0.67 mmol) was added to a precooled diethyl ether (10 mL) solution of Ph(H)Si(Me3SiCH2Cp)2Li2 (280 mg, 0.67 mmol) at −25° C. The resulting mixture was stirred overnight at room temperature. Insoluble materials were filtered out and volatiles from the filtrate were removed in vacuo. The resulting materials were dried under vacuum to obtain the yellow crystalline solid of Ph(H)Si(Me3SiCH2Cp)2HfCl2 in 366 g (83.2%) yield. The 1H NMR spectrum of final material revealed multiple rac/meso isomers because of the asymmetric chemical environment at the silicon bridge atom. 1H NMR (400 MHz, CD2Cl2): δ-0.04-0.05 (18H, m, Si—CH3), 1.97-2.25 (4H, m, Me3Si—CH2), 5.05-5.30 (1H, m, Si—H), 5.42-6.43 (6H, m, Cp-CH), 7.48-7.61 (3H, m, Ar—CH), 7.82-7.98 (2H, m, Ar—CH) ppm.

Catalyst 4: Synthesis of Rac-meso-phenylsilyl-bis(trimethylsilylmethyl cyclopentadienyl)hafnium dimethyl, Ph(H)Si(Me3SiCH2Cp)2HfMe2

An ethereal solution of MeMgBr (0.4 mL, 1.13 mmol) was added dropwise to a precooled diethyl ether solution of Ph(H)Si(Me3SiCH2Cp)2HfCl2 (366 mg, 0.56 mmol) over a period of 2-3 minutes at −25° C. The resulting mixture was stirred overnight at room temperature to ensure completion of the reaction. Insoluble materials were filtered through a pad of celite packed pipette filter. All volatiles from the filtrate were removed under vacuum, and then the crude materials were extracted into pentane. Solvent removal in vacuo afforded a sticky yellow material of Ph(H)Si(Me3SiCH2Cp)2HfMe2 in 280 mg (81.3%) yield. The 1H NMR spectrum of final material revealed multiple rac/meso isomers because of the asymmetric chemical environment at the silicon bridge atom. 1H NMR (400 MHz, C6D6): δ −0.34-(−)0.15 (6H, m, Hf—CH3), 0.01-0.08 (18H, m, Si—CH3), 1.85-2.21 (4H, m, Me3Si—CH2), 4.96-5.07 (1H, m, Si—H), 5.21-5.82 (4H, m, Cp-CH), 6.18-6.39 (2H, m, Cp-CH), 7.13-7.15 (1H, m, Ar—CH), 7.18-7.26 (2H, m, Ar—CH), 7.71-7.94 (2H, m, Ar—CH) ppm.

Synthesis of Chloromethyl(2,3,4,5-tetramethyl-2,4-cyclopentadienyl)silane, Me(H)Si(Me4CpH)Cl A neat Me(H)SiCl2 (5.0 g, 43.5 mmol) was dissolved in 60 mL of THF and cooled to −25° C. A solid Me4Cp-Li (5.57 g, 43.5 mmol) was added to the above mixture and the resulting mixture was stirred overnight at room temperature. All volatiles from the reaction mixture were removed in vacuo and triturated with pentane. The crude materials were then extracted into pentane and followed by solvent removal under vacuum afforded a thick yellow oil of Me(H)Si(Me4CpH)Cl in 8.4 g (96.7%) yield. 1H NMR (400 MHz, C6D6): δ-0.15 (0.7H, d, JHH=3.7 Hz, Si—CH3), −0.06 (2.3H, d, JHH=2.9 Hz, Si—CH3), 1.68 (2H, s, Cp-CH3), 1.70 (2H, s, Cp-CH3), 1.81 (4H, s, Cp-CH3), 1.94 (1H, s, Cp-CH3), 1.97 (3H, s, Cp-CH3), 2.79 (0.4H, bs, Cp-CH), 2.96 (0.6H, bs, Cp-CH), 4.03-4.06 (0.2H, m, Si—H), 4.89 (0.8H, bs, Si—H) ppm.

Synthesis of Methyl(2,3,4,5-tetramethyl-2,4-cyclopentadienyl cyclopentadien-1-yl)-((trimethylsilyl)methylcyclopentadienyl)silane, Me(H)Si(Me4CpH)(Me3SiCH2CpH)

A solid Me3SiCH2CpLi (500 mg, 3.2 mmol) was added to a precooled ethereal solution of Me(H)Si(Me4CpH)Cl (632 mg, 3.2 mmol) at −25° C. The resulting mixture was stirred overnight at room temperature to ensure completion of the reaction. Volatiles from the reaction mixture were removed in vacuo and triturated with pentane. The crude materials were extracted into pentane and followed by solvent removal under vacuum afforded a thick yellow oil of Me(H)Si(Me4CpH)(Me3SiCH2CpH) in 590 mg (56.8%) yield. 1H NMR (400 MHz, C6D6): δ-0.04 (1.3H, s, Si—CH3), −0.01 (1.7H, s, Si—CH3), 0.04 (9H, s, Si—CH3), 1.80 (3H, s, Cp-CH3), 1.82 (3H, s, Cp-CH3), 1.91 (3H, s, Cp-CH3), 1.94 (2H, s, Me3Si—CH2), 1.97 (3H, s, Cp-CH3), 3.25 (1H, bs, Cp-CH), 3.64 (1H, bs, Cp-CH), 4.67-4.72 (1H, m, Si—H), 6.01-6.79 (3H, m, Cp-CH) ppm.

Synthesis of Lithium Methylsilyl-(tetramethylcyclopentadienyl cyclopentadienide) (trimethylsilylmethyl cyclopentadienyl), Me(H)Si(Me4Cp)(Me3SiCH2Cp)Li2

A hexane solution of n-butyl lithium (1.5 mL, 3.68 mmol, 2.5 M solution) was added drop wise to a precooled solution of Me(H)Si(Me4CpH)(Me3SiCH2CpH) (576 mg, 1.82 mmol) in 10 mL of THF over a period of 2-3 minutes at −25° C. The resulting mixture was gradually warmed to room temperature and then continuously stirred overnight. All volatiles from the reaction mixture were removed in vacuo, and triturated with pentane. The crude materials were thoroughly washed with pentane to remove any soluble impurities, and dried under vacuum to obtain a colorless crystalline solid of Me(H)Si(Me4Cp)(Me3SiCH2Cp)Li2 in 590 mg (98.7%) yield. 1H NMR (400 MHz, THF-d8): δ −0.10 (9H, s, Si—CH3), 0.36 (3H, d, JHH=3.5 Hz, Si—CH3), 1.69 (2H, bs, Me3Si—CH2), 1.86 (6H, s, Cp-CH3), 2.04 (6H, s, Cp-CH3), 4.96 (1H, q, JSiH=3.9 Hz, Si—H), 5.48 (1H, t, JHH=2.3 Hz, Cp-CH), 5.60 (1H, t, JHH=2.0 Hz, Cp-CH), 5.68 (1H, t, JHH=2.3 Hz, Cp-CH) ppm.

Synthesis of Methylsilyl-(tetramethyl cyclopentadienyl) (trimethylsilylmethyl cyclopentadienyl)hafnium dichloride, Me(H)Si(Me4Cp)(Me3SiCH2Cp)HfCl2

A solid HfCl4 (574 mg, 1.8 mmol) was added to a precooled ethereal solution (10 mL) of Me(H)Si(Me4Cp)(Me3SiCH2Cp)Li2 (590 mg, 1.8 mmol) at −25° C. The resulting mixture was stirred overnight at room temperature. Insoluble materials were filtered out and volatiles from the filtrate were removed in vacuo. The crude materials were washed with cold pentane to remove soluble impurities. The resulting materials were dried under vacuum to obtain the pale yellow crystalline solid of Me(H)Si(Me4Cp)(Me3SiCH2Cp)HfCl2 in 480 mg (47.5%) yield. 1H NMR (400 MHz, CD2Cl2): δ-0.31 (9H, s, Si—CH3), 0.63 (1.5H, s, Si—CH3), 0.64 (1.5H, s, Si—CH3), 1.69 (2H, s, Me3Si—CH2), 1.73 (3H, s, Cp-CH3), 1.76 (5H, overlapped singlets, Cp-CH3), 1.81 (4H, overlapped singlets, Cp-CH3), 4.77-4.81 (1H, m, Si—H), 4.95-5.05 (2H, m, Cp-CH), 6.02-6.09 (1H, m, Cp-CH) ppm.

Catalyst 5: Synthesis of Methylsilyl-(tetramethylcyclopentadienyl) (trimethylsilylmethyl cyclopentadienyl)hafnium dimethyl, Me(H)Si(Me4Cp)(Me3SiCH2Cp)HfMe2

An ethereal solution of MeMgBr (0.58 mL, 1.73 mmol) was added drop wise to a precooled diethyl ether solution of Me(H)Si(Me4Cp)(Me3SiCH2Cp)HfCl2 (480 mg, 0.86 mmol) over a period of 5-10 minutes at −25° C. The resulting mixture was stirred overnight at room temperature to ensure completion of the reaction. All volatiles from the reaction mixture were removed under vacuum, and the crude materials were then extracted into pentane. Solvent removal in vacuo afforded a sticky yellow material of Me(H)Si(Me4Cp)(Me3SiCH2Cp)HfMe2 in 280 mg (62.2%) yield. 1H NMR (400 MHz, C6D6): δ −0.48-0.43 (6H, m, Hf—CH3), −0.02 (9H, s, Si—CH3), 0.04-0.43 (3H, m, Si—CH3), 1.71 (2H, s, Me3Si—CH2), 1.82 (3H, s, Cp-CH3), 1.97-2.05 (9H, m, Cp-CH3), 4.94-5.01 (1H, m, Si—H), 5.08 (1H, t, JHH=2.3 Hz, Cp-CH), 5.27 (1H, t, JHH=2.6 Hz, Cp-CH), 6.27 (1H, m, Cp-CH) ppm.

Synthesis of Methylsilyl-(tetramethylcyclopentadienyl) (trimethylsilylmethyl cyclopentadienyl)zirconium dichloride, 0.5 dimethoxyethane complex, Me(H)Si(Me4Cp)(Me3SiCH2Cp)ZrCl2.0.5 dme A solid ZrCl4(dme) (669 mg, 2.1 mmol) was added to a precooled ethereal solution (30 mL) of Me(H)Si(Me4Cp)(Me3SiCH2Cp)Li2 (680 mg, 2.1 mmol) at −25° C. The resulting mixture was stirred overnight at room temperature.

Solvents were removed in vacuo and then extracted into diethyl ether. The resulting materials were dried under vacuum to obtain the pale yellow crystalline solid of Me(H)Si(Me4Cp)(Me3SiCH2Cp)ZrCl2.0.5 dme in 960 mg (87.6%) yield. 1H NMR (400 MHz, CD2Cl2): 6-0.02-(−)0.01 (9H, m, Si—CH3), 0.89-0.92 (3H, m, Si—CH3), 1.89-2.06 (14H, m, Me3Si—CH2 and Cp-CH3), 3.45 (3H, s, dme-OCH3), 3.60 (2H, s, dme-CH2), 5.11-5.13 (1H, m, Si—H), 5.25-5.65 (2H, m, Cp-CH), 6.39-6.44 (1H, m, Cp-CH) ppm.

Catalyst 6: Synthesis of Methylsilyl-(tetramethylcyclopentadienyl) (trimethylsilylmethyl cyclopentadienyl)zirconium dimethyl, Me(H)Si(Me4Cp)(Me3SiCH2Cp)ZrMe2

An ethereal solution of MeMgBr (1.3 mL, 3.72 mmol) was added drop wise to a precooled diethyl ether solution of Me(H)Si(Me4Cp)(Me3SiCH2Cp)ZrCl2.0.5 dme (960 mg, 1.84 mmol) over a period of 5-10 minutes at −25° C. The resulting mixture was stirred overnight at room temperature to ensure completion of the reaction. All volatiles from the reaction mixture were removed under vacuum, and the crude materials were then extracted into pentane. Solvent removal in vacuo afforded a colorless semi-solid of Me(H)Si(Me4Cp)(Me3SiCH2Cp)ZrMe2 in 610 mg (76.1%) yield. 1H NMR (400 MHz, C6D6): δ-0.30-(−)0.26 (6H, m, Zr—CH3), 0.03 (9H, s, Si—CH3), 0.38-0.42 (3H, m, Si—CH3), 1.67-1.69 (3H, m, Cp-CH3), 1.77-1.80 (3H, m, Cp-CH3), 1.97-2.01 (6H, m, Cp-CH3), 2.14-2.16 (2H, broad doublet, Me3Si—CH2), 4.93-5.01 (1H, m, Si—H), 5.12-5.63 (2H, m, Cp-CH), 6.38-6.44 (1H, m, Cp-CH) ppm.

Supported Catalyst Preparations

Catalyst 1

A 0.8 g amount of prepared ES-70 875C SMAO was stirred in 10 mL of toluene using a Celstir™ flask. Methylsilyl bis(n-propyl-cyclopentadienyl)hafnium dimethyl, (15.1 mg, 32.5 μmol) was added to the slurry and stirred for three hours. The mixture was filtered, washed with several 10 mL portions of hexane and then dried under vacuum, yielding 0.71 g of white silica.

Catalyst 2

A 1.0 g amount of prepared ES-70 875C SMAO was stirred in 10 mL of toluene using a Celstir™ flask. Phenylsilyl bis(n-propyl-cyclopentadienyl)hafnium dimethyl, (20.0 mg, 40 μmol) was added to the slurry and stirred for three hours. The mixture was filtered, washed with several 10 mL portions of hexane and then dried under vacuum, yielding 0.93 g of white silica.

Catalyst 3

A 1.0 g amount of prepared ES-70 875C SMAO was stirred in 10 mL of toluene using a Celstir™ flask. Methylsilyl bis(trimethylsilylmethylene cyclopentadienyl)hafnium dimethyl, (22.1 mg, 40 μmol) was added to the slurry and stirred for three hours. The mixture was filtered, washed with several 10 mL portions of hexane and then dried under vacuum, yielding 0.91 g of white silica.

Catalyst 4

A 0.76 g amount of prepared ES-70 875C SMAO was stirred in 10 mL of toluene using a Celstir™ flask. Phenylsilyl bis(trimethylsilylmethylene cyclopentadienyl)hafnium dimethyl, (18.7 mg, 30.4 μmol) was added to the slurry and stirred for three hours. The mixture was filtered, washed with several 10 mL portions of hexane and then dried under vacuum, yielding 0.70 g of white silica.

Catalyst 5

A 1.0 g amount of prepared ES-70 875C SMAO was stirred in 10 mL of toluene using a Celstir™ flask. Methylsilyl (trimethylsilylmethyl-cyclopentadiene)(tetramethyl-cyclopentadienyl)hafnium dimethyl, (20.9 mg, 40 μmol) was added to the slurry and stirred for three hours. The mixture was filtered, washed with several 10 mL portions of hexane and then dried under vacuum, yielding 0.90 g of white silica.

Catalyst 6

A 1.0 g amount of prepared ES-70 875C SMAO was stirred in 10 mL of toluene using a Celstir™ flask. Methylsilyl (trimethylsilylmethyl-cyclpentadiene)(tetramethyl-cyclopentadienl)zirconium dimethyl, (17.4 mg, 40 μmol) was added to the slurry and stirred for three hours. The mixture was filtered, washed with several 10 mL portions of hexane and then dried under vacuum, yielding 0.81 g of light yellow silica.

Mixed Catalyst Support Preparations

Supported Catalyst: Mixed Catalyst System 1

A 1.0 g amount of prepared ES-70 875C SMAO was stirred in 10 mL of toluene using a Celstir™ flask. Methylsilyl (trimethylsilylmethyl-cyclopentadienyl)(tetramethyl-cyclopentadienyl)hafnium dimethyl, 5, (15.7 mg, 30 μmol) and Bis(1-methylindenyl) zirconium dichloride (3.8 mg, 10 μmol) were added to the slurry and stirred for three hours. The mixture was filtered, washed with several 10 mL portions of hexane and then dried under vacuum, yielding 0.92 g of light yellow silica.

Supported Catalyst: Mixed Catalyst System 2

A 1.0 g amount of prepared ES-70 875C SMAO was stirred in 10 mL of toluene using a Celstir™ flask. Methylsilyl bis(n-propyl-cyclopentadienyl)hafnium dimethyl, 1, (12.4 mg, 26.6 μmol), and meso-bis(1-ethylindenyl) zirconium dimethyl (5.4 mg, 13.3 μmol) were added to the slurry and stirred for three hours. The mixture was filtered, washed with several 10 mL portions of hexane and then dried under vacuum, yielding 0.91 g of light yellow silica.

Catalyst Activity During Polymerization with Organosilica Support Catalyst Systems A 2 L autoclave was heated to 110° C. and purged with N2 for at least 30 minutes. The autoclave was charged with dry NaCl (350 g; Fisher, S271-10 dehydrated at 180° C. and subjected to several pump/purge cycles and finally passed through a 16 mesh screen prior to use) and sMAO (5 g) at 105° C. and stirred for 30 minutes. The temperature was adjusted to 85° C. At a pressure of 2 psig N2, dry, degassed 1-hexene (2.0 mL) was added to the reactor with a syringe then the reactor was charged with N2 to a pressure of 20 psig. A mixture of H2 and N2 was flowed into reactor (200 SCCM; 10% H2 in N2) while stirring the bed.

Various catalysts indicated in Table 1 or catalyst systems in Table 2 were injected into a reactor with ethylene at a pressure of 220 psig; ethylene flow was allowed over the course of the run to maintain constant pressure in the reactor. For each sample, 1-hexene was fed into the reactor as a ratio to ethylene flow (0.1 g/g). Hydrogen was fed to the reactor as a ratio to ethylene flow (0.5 mg/g). The hydrogen and ethylene ratios were measured by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least for two days.

FIG. 1 is a TREF graph 100 of polyethylene copolymer produced by Catalyst 1. As shown in FIG. 1, Catalyst 1 (line 102) provides a multimodal polyethylene copolymer having predominantly low density polyethylene copolymer (peak 104) and less high density material (peak 106) than HfP. (Wf (%) is weight fraction %).

Figure 2:
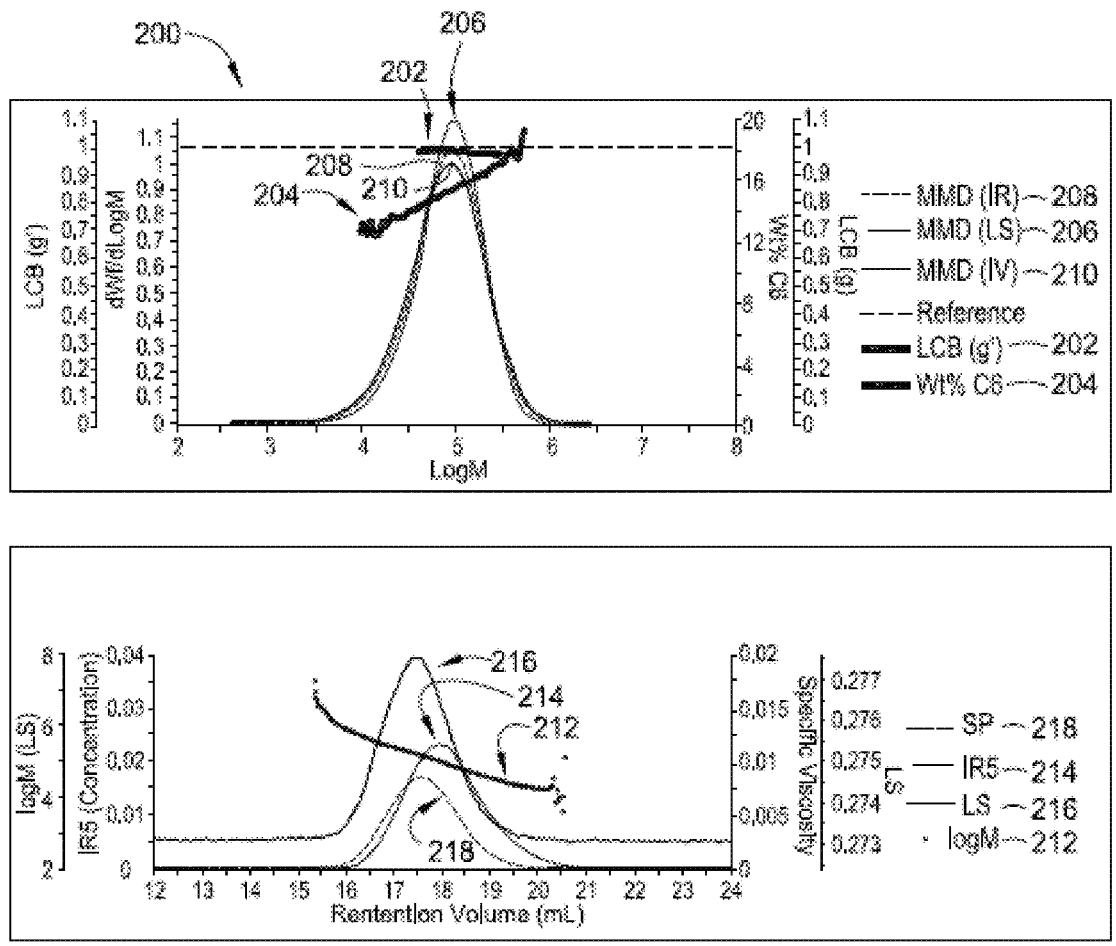
FIG. 2 is a 4D GPC graph of polyethylene copolymer produced by supported Catalyst 1.

FIG. 2 is a 4D GPC graph 200 of polyethylene copolymer produced by supported Catalyst 1. As shown in FIG. 2, Catalyst 1 provides linear polyethylene copolymers as evidenced by g'(vis) (line 202) average value of 0.973. Comonomer content (line 204) ranges from about 12 wt % to about 18 wt %, with an average of 15.77 wt %. Line 204 has a positive slope indicative of higher comonomer content in higher molecular weight polyethylene copolymers. Molar mass determination is represented by lines (IR) 208, LS 206, and IV 210. Log M is represented by line 212. IR concentration is represented by line 214. Log M (LS) is represented by line 216. Specific viscosity is represented by line 218.

These data show that Catalyst 1 provides linear low density polyethylene copolymers having a high comonomer content and narrow MWD.

TABLE 1

Slurry Phase Polymerization of Ethylene and 1-Hexene

| Supported Catalyst Sample | MI dg/min | MIR | Mw g/mol | Mn g/mol | MWD | Hexene wt % | Activity gPolymer/ gSupported catalyst | g'(vis) |
|---|---|---|---|---|---|---|---|---|
| I | 0.5661.4 | 23.6 | 99017 | 31769 | 3.12 | 9.74 | 7881 | 0.991 |
| II | 1.8 | 26.7 | 88697 | 30774 | 2.88 | 10.86 | 8636 | 0.980 |
| Catalyst 1 | 0.79 | 24.5 | 112862 | 53672 | 2.1 | 15.66 | 5351 | 0.973 |
| Catalyst 2 | 1.03 | 27.28 | 102476 | 33140 | 3.09 | 12.15 | 7103 | 1.017 |
| Catayst 5 | 1.35 | 28.10 | 100926 | 28283 | 3.57 | 12.24 | 6733 | 0.982 |
| Catalyst 4 | 1.953 | 37.8 | 77393 | 27564 | 2.81 | 15.04 | 8210 | 0.965 |
| Catalyst 6 | 12.5 | — | — | — | — | — | 10075 | — |
| Catalyst 3 | 1.2 | 36.4 | — | — | — | — | 8860 | — |

The data in Table 1 are averaged numbers based on several measurements. As shown in Table 1, I is (n-propylCP)$_2$Hf(Me)$_2$ and II is Me$_2$Si(n-propylCP)$_2$Hf(Me)$_2$. I and II are known catalysts that provide polyethylene copolymers with hexene comonomer content of between 9.3 wt % and 10.86 wt %. In comparison, Catalyst 1 of the present disclosure provides high molecular weight polyethylene copolymers with hexene comonomer content of about 15 wt % (15.66 wt %). Furthermore, Catalyst 1 provides an MWD value of 2.1. Catalyst 2 provides high molecular weight polyethylene copolymers with hexene comonomer content of about 12 wt % (12.15 wt %) and an MWD value of about 3 (3.09). Catalyst 4 provides polyethylene copolymers with hexene comonomer content of about 15 wt % (15.04 wt %) and an MWD value of about 2.8 (2.81) but lower molecular weight as compared to polyethylene copolymers synthesized using Catalyst 1. Catalyst 5 provides high molecular weight polyethylene copolymers with hexene comonomer content of about 12 wt % (12.24 wt %) and an MWD value of about 3.6 (3.57). These catalysts may be utilized, for example, as a catalyst for providing the high molecular weight fraction of a bimodal polyolefin composition, such as a resin, having a broad orthogonal composition distribution.

TABLE 2

Mixed Catalyst Polymerization Data:

| Supported Catalyst Sample | MI dg/min | MIR | Mw g/mol | Mn g/mol | MWD | Hexene wt % | Activity gPolymer/ gSupported catalyst | g'(vis) |
|---|---|---|---|---|---|---|---|---|
| Mixed Catalyst System 1 | 0.83 | 36.15 | 107462 | 21107 | 5.09 | 10.03 | 9406 | 0.939 |
| Mixed Catalyst System 2 | 1.03 | 27.28 | 102476 | 33140 | 3.09 | 12.15 | 7103 | 1.017 |

As shown in Table 2, mixed catalyst system 1 provides polyethylene compositions having linear low density polyethylene copolymers having a high molecular weight fraction having a high comonomer content and MWD value of about 5. Mixed catalyst system 2 provides polyethylene compositions having linear low density polyethylene copolymers having a high molecular weight fraction with a higher comonomer content and narrowed MWD than mixed catalyst system 1.

Overall, catalyst compounds of Formula (I) or Formula (II) and catalyst systems thereof provide high comonomer content, linear, high molecular weight polyolefin copolymers and BOCD polyolefin copolymer compositions having increased density split and high comonomer content.

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

We claim:

1. A catalyst compound represented by Formula (I) or Formula (II):

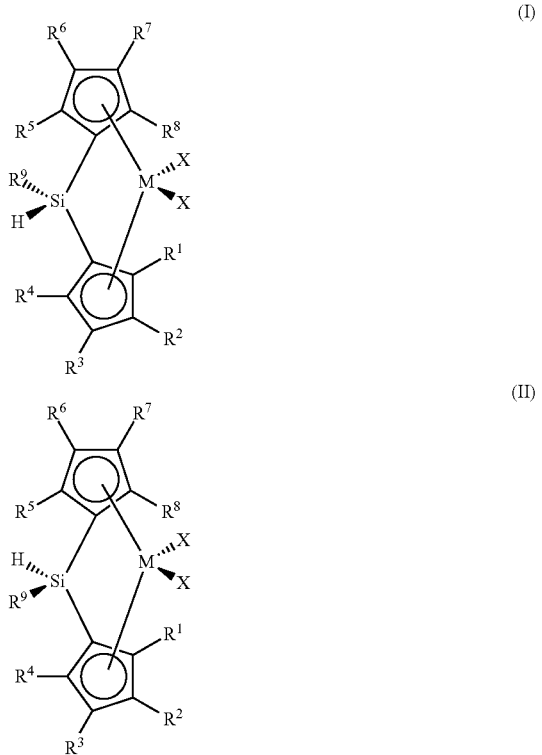

where M is Ti, Hf, or Zr,
each of $R^1$, $R^2$, $R^3$, $R^4$, $R^5$, $R^6$, $R^7$, and $R^8$ is independently hydrogen, or a C1-C50 substituted or unsubstituted hydrocarbyl, halocarbyl, silylcarbyl, alkoxyl, siloxyl, or one or more of $R^1$ and $R^2$, $R^2$ and $R^3$, $R^3$ and $R^4$, $R^5$ and $R^6$, $R^6$ and $R^7$, and $R^7$ and $R^8$ are joined to form cyclic a saturated or unsaturated ring,
each of $R^6$ or $R^7$ and $R^2$ or $R^3$ is linear or branched C3-C10 unsubstituted hydrocarbyl,
$R^9$ is unsubstituted phenyl or linear or branched C1-C5 alkyl, and
each X is independently a halide or C1-C50 substituted or unsubstituted hydrocarbyl, hydride, amide, alkoxide, sulfide, phosphide, halide, or a combination thereof, or two Xs are joined together to form a metallocycle ring, or two Xs are joined to form a chelating ligand, a diene ligand, or an alkylidene.

2. The catalyst compound of claim 1, wherein each X is independently a halide or C1-C10 substituted or unsubstituted hydrocarbyl.

3. A catalyst system comprising:
(a) the catalyst compound of claim 1; and
(b) a bridged or unbridged metallocene catalyst compound other than the catalyst compound of (a).

4. The catalyst system of claim 3, wherein the metallocene catalyst compound of (b) is an unbridged metallocene catalyst compound represented by the formula: $Cp^A Cp^B M'X'_n$, wherein each $Cp^A$ and $Cp^B$ is independently selected from the group consisting of cyclopentadienyl ligands and ligands isolobal to cyclopentadienyl, one or both $Cp^A$ and $Cp^B$ optionally contain heteroatoms, and one or both $Cp^A$ and $Cp^B$ are optionally substituted by one or more R" groups, wherein M' is selected from the group consisting of Groups 3 through 12 atoms and lanthanide Group atoms, wherein X' is an anionic leaving group, wherein n is 0 or an integer from 1 to 4, wherein R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

5. The catalyst system of claim 3, wherein the metallocene catalyst compound is a bridged metallocene catalyst compound represented by the formula: $Cp^A(A)Cp^B M'X'_n$, wherein each $Cp^A$ and $Cp^B$ is independently selected from the group consisting of cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups, wherein M' is selected from the group consisting of Groups 3 through 12 atoms and lanthanide Group atoms, wherein X' is an anionic leaving group, wherein n is 0 or an integer from 1 to 4, wherein (A) is a bridging group containing at least one Group 13, 14, 15, or 16 element.

6. The catalyst system of claim 3, further comprising an activator and a support material.

7. A catalyst system comprising:
the catalyst compound of claim 1;
an activator; and
a support material.

8. The catalyst system of claim 7, wherein the activator comprises one or more of:
N,N-dimethylanilinium tetra(perfluorophenyl)borate,
N,N-dimethylanilinium tetrakis(perfluoronaphthyl)borate,
N,N-dimethylanilinium tetrakis(perfluorobiphenyl)borate,
N,N-dimethylanilinium tetrakis(3,5-bis(trifluoromethyl)phenyl)borate,
triphenylcarbenium tetrakis(perfluoronaphthyl)borate,
triphenylcarbenium tetrakis(perfluorobiphenyl)borate,
triphenylcarbenium tetrakis(3,5-bis(trifluoromethyl)phenyl)borate,
triphenylcarbenium tetra(perfluorophenyl)borate,
trimethylammonium tetrakis(perfluoronaphthyl)borate,
triethylammonium tetrakis(perfluoronaphthyl)borate, tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate, and
tropillium tetrakis(perfluoronaphthyl)borate.

9. The catalyst system of claim 7, wherein the activator comprises an alkylalumoxane.

10. The catalyst system of claim 7, wherein the support material is selected from the group consisting of $Al_2O_3$, $ZrO_2$, $SiO_2$, and $SiO_2/Al_2O_2$.

11. The catalyst system of claim 10, wherein the support material is fluorided.

12. A method of polymerizing olefins to produce at least one polyolefin composition, the method comprising:
 contacting at least one olefin with the catalyst system of claim 3; and
 obtaining a polyolefin.

13. The method of claim 12, wherein the polyolefin composition contains a multi-modal polyolefin composition comprising a high molecular weight fraction that is greater than about 10 wt % hexene, wherein the high molecular weight fraction is produced by the catalyst compound represented by Formula (I) or Formula (II).

14. The method of claim 13, wherein the high molecular weight fraction comprises about 15 wt % hexene or more.

15. The method of claim 4, wherein each $Cp^A$ and $Cp^B$ is indenyl and is represented by the Formula (III'):

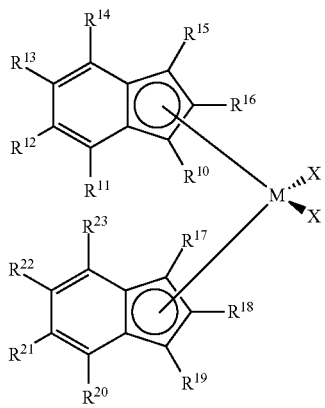

(III')

wherein M is a group 4 metal,
 each X is independently a halide or C1-C50 substituted or unsubstituted hydrocarbyl, hydride, amide, alkoxide, sulfide, phosphide, halide, diene, amine, phosphine, ether, or a combination thereof, or two Xs are joined together to form a metallocycle ring, or two Xs are joined to form a chelating ligand, a diene ligand, or an alkylidene, and
 each of $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ is independently hydrogen, a hydrocarbyl group, a substituted hydrocarbyl group, or a heteroatom group.

16. The method of claim 12, wherein further comprising alkylalumoxane present at a molar ratio of aluminum to catalyst compound group 4 metal of 100:1 or more.

17. The method of claim 12, wherein the catalyst system further comprises an activator represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3.

18. The method of claim 12, wherein the catalyst system further comprises an activator represented by the formula:

$$(Z)_d^+(A^{d-})$$

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

19. The method of claim 12, wherein the method occurs at a temperature of from about 0° C. to about 300° C., at a pressure in the range of from about 0.35 MPa to about 10 MPa, and at a time up to about 300 minutes.

20. The method of claim 12, wherein the olefins comprise ethylene, propylene, butene, pentene, hexene, heptene, octene, nonene, decene, undecene, dodecene, or mixtures thereof.

21. The method of claim 12, wherein, further comprising introducing the first catalyst compound represented by Formula (I) or Formula (II) into a reactor as a slurry.

22. The catalyst compound of claim 1, wherein the catalyst compound represented by Formula (I) or Formula (II) comprises one or more of:

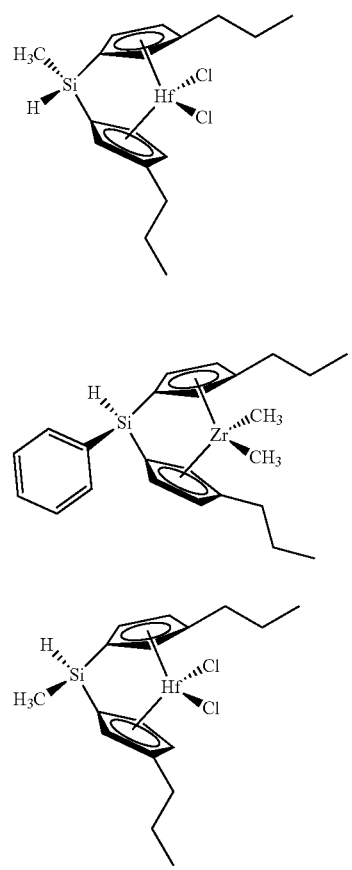

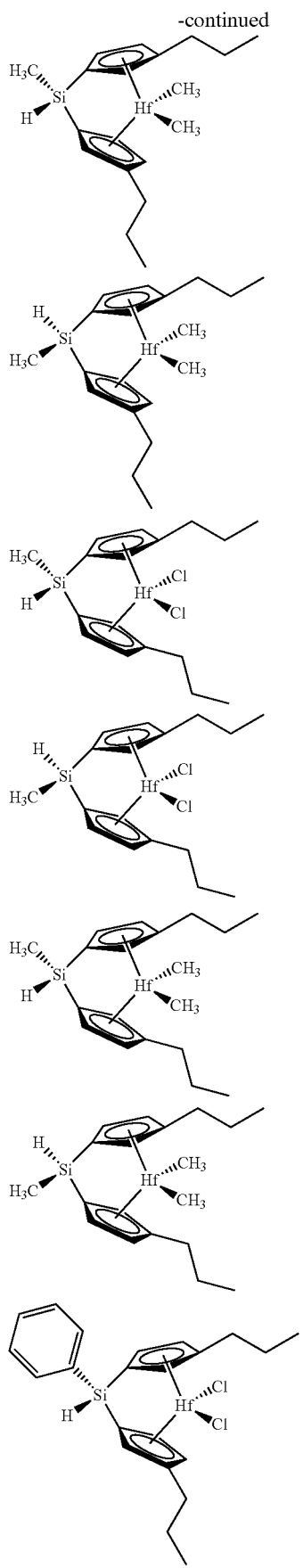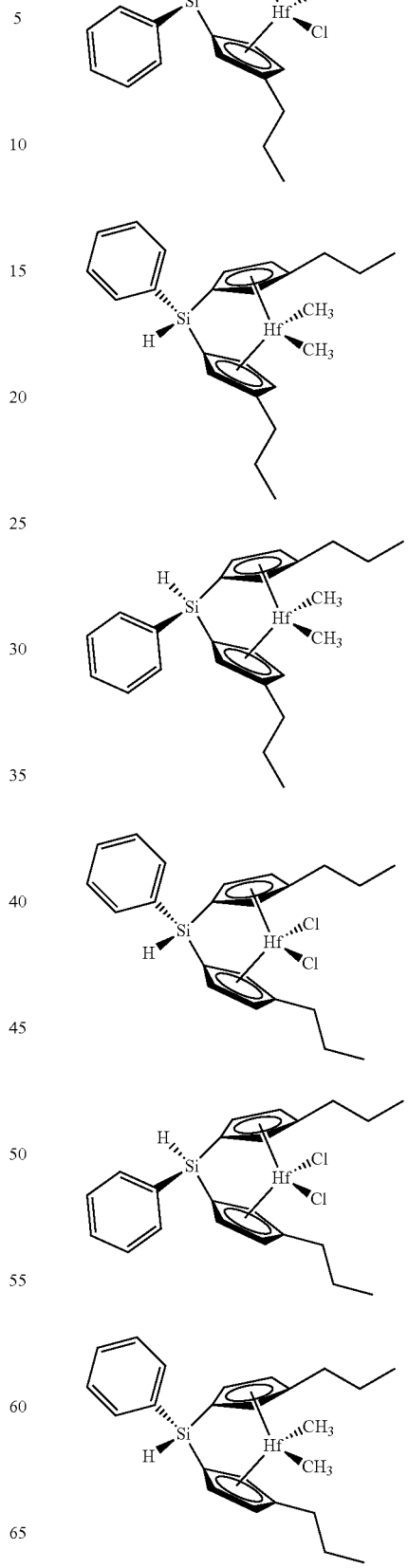

-continued
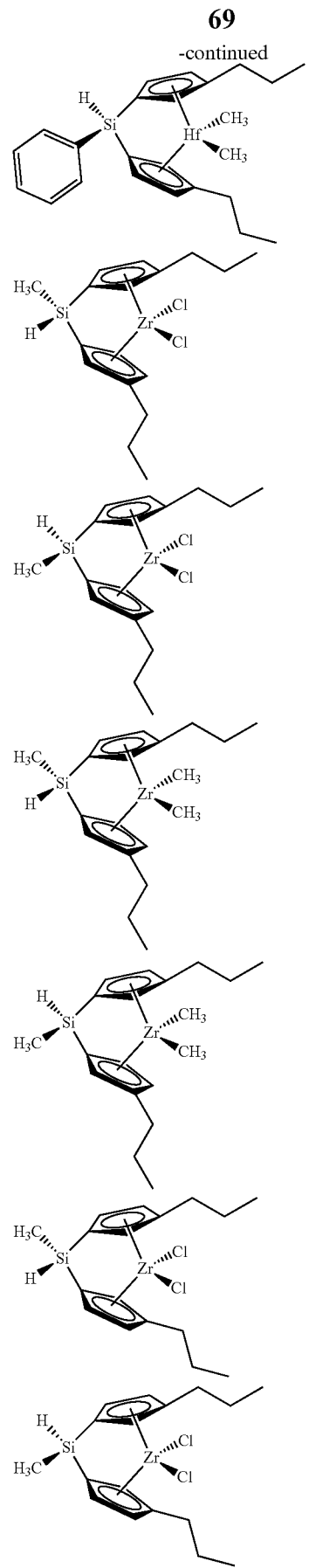
-continued
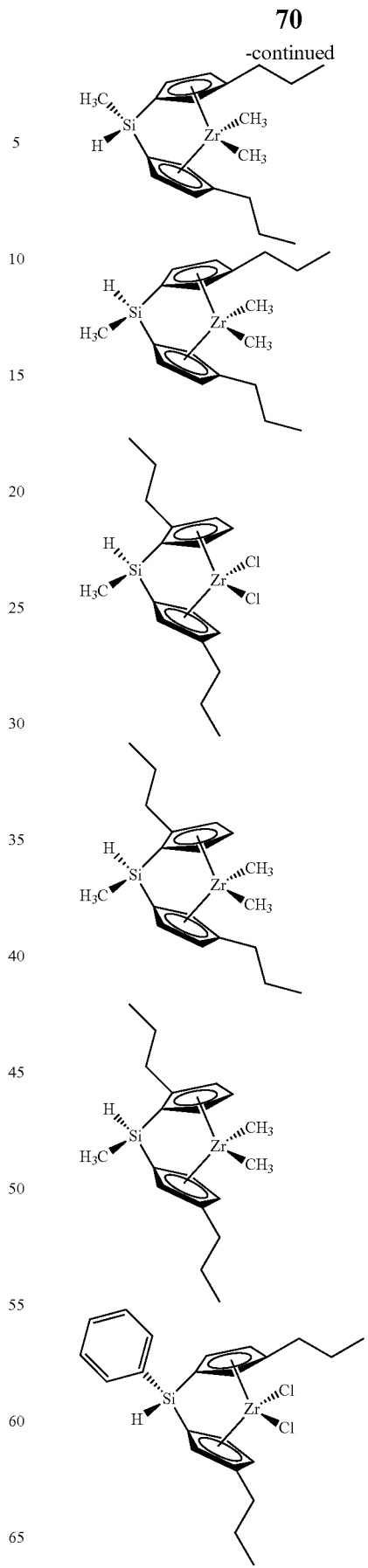

-continued
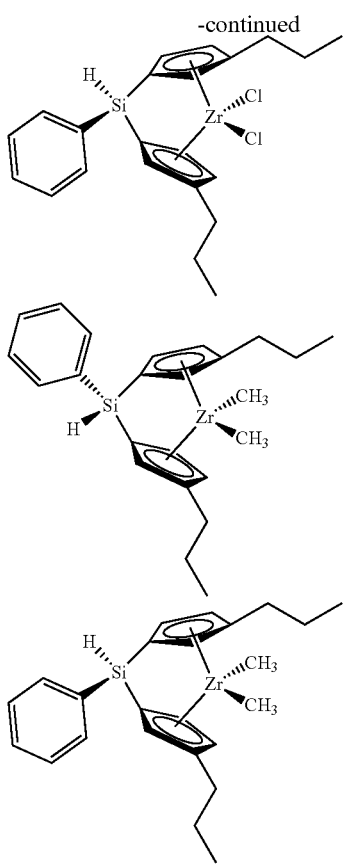
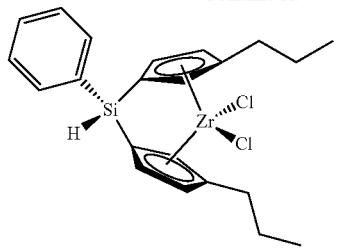
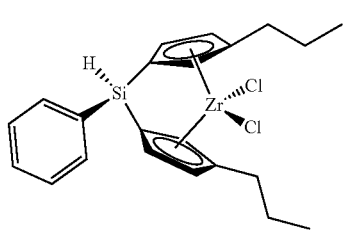
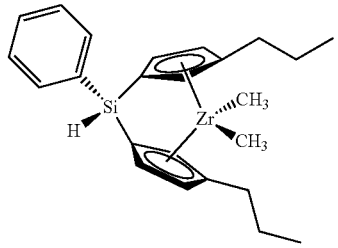
* * * * *